US009784413B2

(12) United States Patent
Lewis et al.

(10) Patent No.: US 9,784,413 B2
(45) Date of Patent: *Oct. 10, 2017

(54) METHODS OF DEPLOYING AND OPERATING VARIABLE-BUOYANCY ASSEMBLY AND NON-COLLAPSIBLE FLUID-LINE ASSEMBLY FOR USE WITH FLUID-PROCESSING PLANT

(71) Applicants: Cameron Lewis, Toronto (CA); Curtis VanWalleghem, Toronto (CA); Kyle Ryan, Toronto (CA)

(72) Inventors: Cameron Lewis, Toronto (CA); Curtis VanWalleghem, Toronto (CA); Kyle Ryan, Toronto (CA)

(73) Assignee: Hydrostor Inc. (CA)

( * ) Notice: Subject to any disclaimer, the term of this patent is extended or adjusted under 35 U.S.C. 154(b) by 253 days.

This patent is subject to a terminal disclaimer.

(21) Appl. No.: 14/527,122

(22) Filed: Oct. 29, 2014

(65) Prior Publication Data

US 2016/0123499 A1 May 5, 2016

(51) Int. Cl.
*F16L 55/00* (2006.01)
*F16L 1/12* (2006.01)
(Continued)

(52) U.S. Cl.
CPC ............ *F17D 1/00* (2013.01); *H02J 15/006* (2013.01); *Y02E 10/28* (2013.01); *Y02E 60/15* (2013.01)

(58) Field of Classification Search
CPC F16L 1/16; H02J 15/006; Y02E 60/15; Y02E 10/28; F17C 2260/046; F17C 2270/0581; F02C 6/16; F03D 9/17
(Continued)

(56) References Cited

U.S. PATENT DOCUMENTS 382,942 A 5/1888 Billings
3,855,809 A 12/1974 Westling
(Continued)

FOREIGN PATENT DOCUMENTS

CA 2704703 6/2009
DE 102012011492 12/2013
(Continued)

OTHER PUBLICATIONS

PCT/IB21015/050582 International Search Report and Written Opinion, completed May 27/28, 2015.
(Continued)

*Primary Examiner* — Benjamin Fiorello
*Assistant Examiner* — Stacy Warren
(74) *Attorney, Agent, or Firm* — Tarolli, Sundheim, Covell & Tummino LLP

(57) ABSTRACT

Method is for operating fluid-processing plant configured to generate and store pressurized fluid, and spaced apart from body of water. Method includes: (A) positioning variable-buoyancy assembly in body of water in such way that buoyancy force urges variable-buoyancy assembly to move toward surface of body of water; (B) positionally anchoring, at least in part, non-collapsible fluid-line assembly underground in such way that non-collapsible fluid-line assembly extends, at least in part, into body of water; (C) fluidly connecting, via non-collapsible fluid-line assembly, fluid-processing plant and variable-buoyancy assembly together in such way that non-collapsible fluid-line assembly conveys pressurized fluid between fluid-processing plant and variable-buoyancy assembly; and (D) transmitting an anchoring force, via non-collapsible fluid-line assembly, from ground to variable-buoyancy assembly in such way that anchoring force substantially counteracts buoyancy force acting on non-collapsible fluid-line assembly, and anchoring force (Continued)

substantially urges variable-buoyancy assembly to remain below surface of body of water.

19 Claims, 24 Drawing Sheets

(51) Int. Cl.
*F16L 1/20* (2006.01)
*F17D 1/00* (2006.01)
*H02J 15/00* (2006.01)

(58) Field of Classification Search
USPC .................. 405/154.1, 158, 159, 160, 210
See application file for complete search history.

(56) References Cited

U.S. PATENT DOCUMENTS

| | | | |
|---|---|---|---|
| 4,053,022 A | 10/1977 | Mercier | |
| 4,422,799 A | 12/1983 | Green et al. | |
| 4,591,295 A | 5/1986 | Collipp | |
| 5,505,502 A | 4/1996 | Smith et al. | |
| 5,513,886 A | 5/1996 | Cyr | |
| 6,439,807 B1 | 8/2002 | Wijsman | |
| 6,863,474 B2 * | 3/2005 | Webster | F17C 1/16 405/195.1 |
| 7,726,911 B1 | 6/2010 | Dempster | |
| 8,197,208 B2 | 6/2012 | Sharpies et al. | |
| 2003/0106714 A1 | 6/2003 | Smith et al. | |
| 2004/0191000 A1 | 9/2004 | Webster et al. | |
| 2006/0228960 A1 | 10/2006 | Durling | |
| 2009/0021012 A1 * | 1/2009 | Stull | F03D 9/17 290/44 |
| 2010/0107627 A1 | 5/2010 | Morgan | |
| 2010/0253077 A1 | 10/2010 | Toupin | |
| 2011/0070031 A1 * | 3/2011 | Frazier | E02D 29/10 405/210 |
| 2011/0211916 A1 | 9/2011 | Frazier et al. | |
| 2012/0097259 A1 | 4/2012 | Baltimore et al. | |
| 2012/0112472 A1 | 5/2012 | Murray et al. | |
| 2013/0019591 A1 * | 1/2013 | Williams | F03D 9/001 60/398 |
| 2014/0033624 A1 | 2/2014 | Blaxland et al. | |
| 2014/0091574 A1 * | 4/2014 | Favy | F02C 6/16 290/52 |
| 2014/0183869 A1 | 7/2014 | Enis et al. | |
| 2015/0214815 A1 | 7/2015 | VanWalleghem et al. | |
| 2016/0177822 A1 * | 6/2016 | Howes | F02C 6/16 60/785 |

FOREIGN PATENT DOCUMENTS

| | | | |
|---|---|---|---|
| EP | 1608840 | 9/2008 | |
| FR | 2983246 B1 * | 11/2013 | F01K 3/12 |
| FR | 2993016 | 1/2014 | |
| WO | 9112408 | 8/1991 | |
| WO | 2004090276 | 10/2004 | |
| WO | 2011038131 | 3/2011 | |
| WO | 2011057358 | 5/2011 | |
| WO | 2014170723 | 10/2014 | |

OTHER PUBLICATIONS

PCT/CA2015/051096 International Search Report, completed Feb. 5, 2016.

PCT/CA2015/051097 International Search Report and Written Opinion, completed Jan. 13, 2016.

* cited by examiner

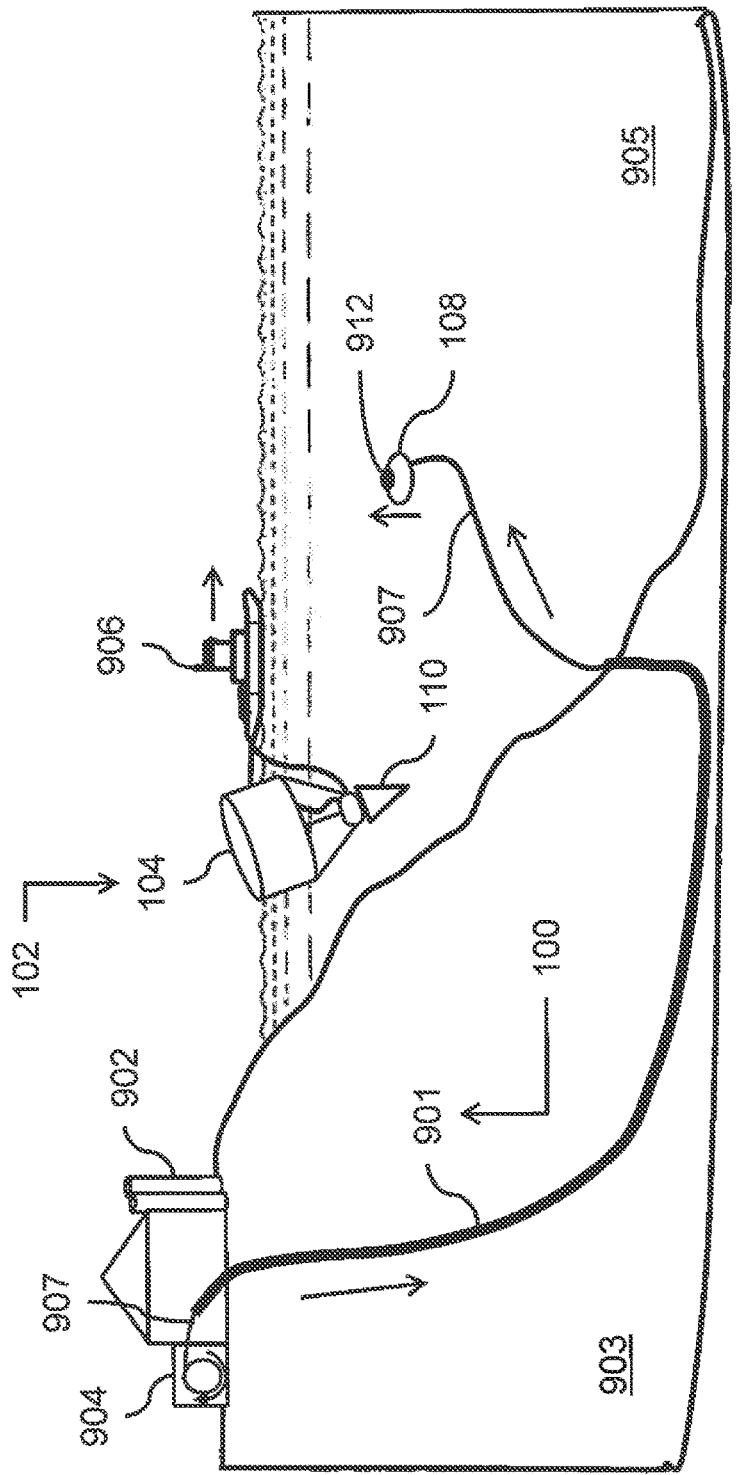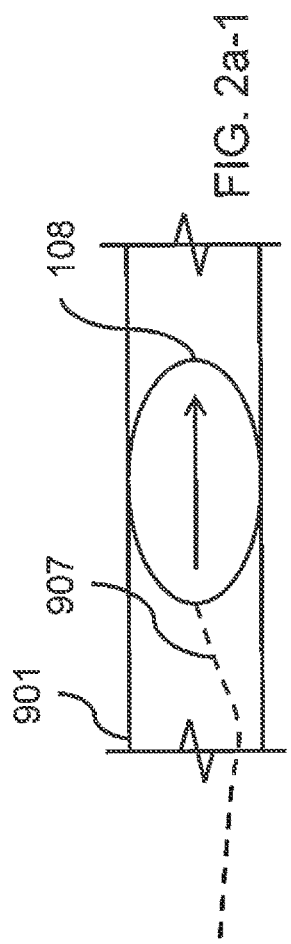
FIG. 2a
FIG. 2a-1

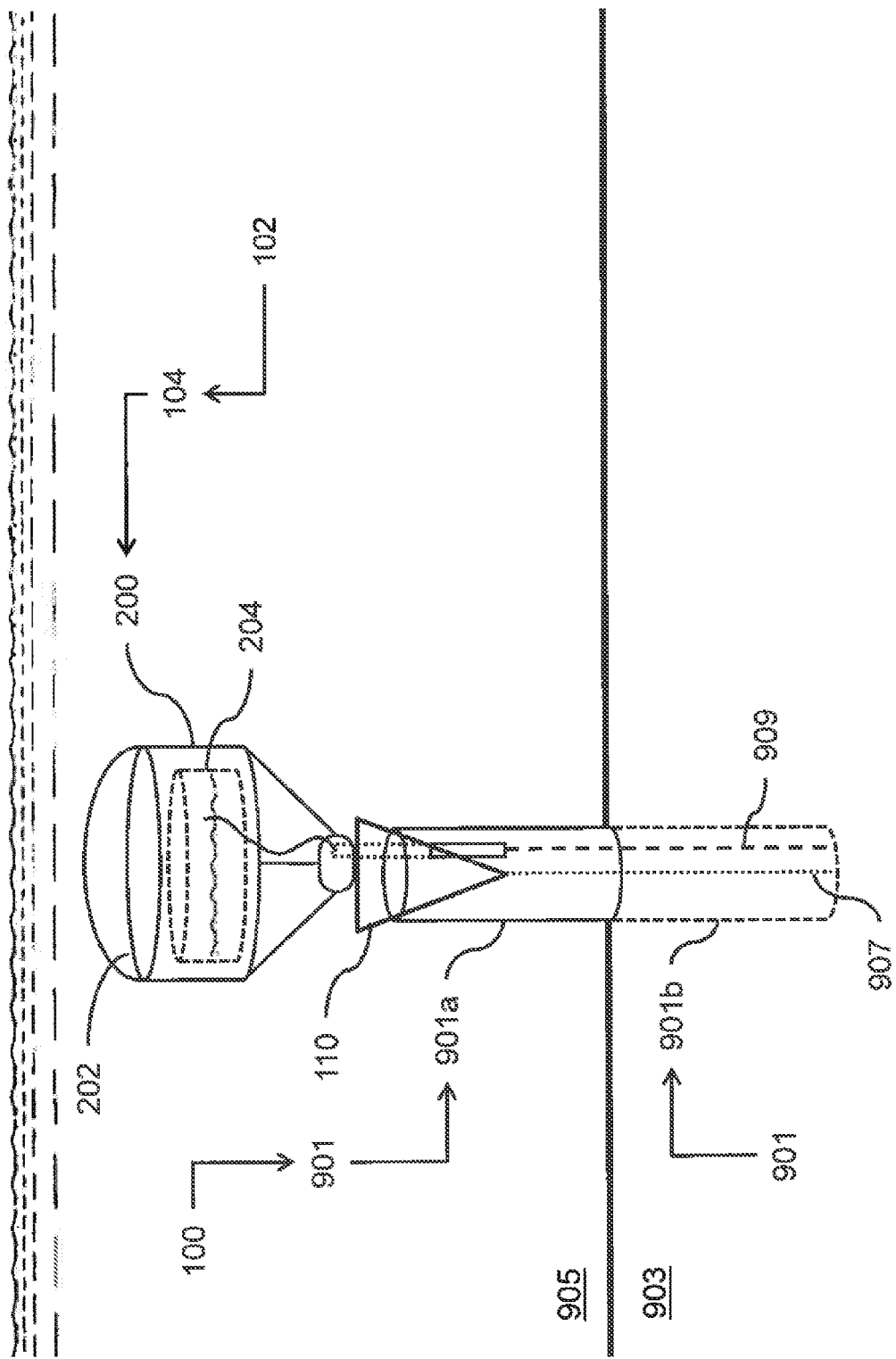

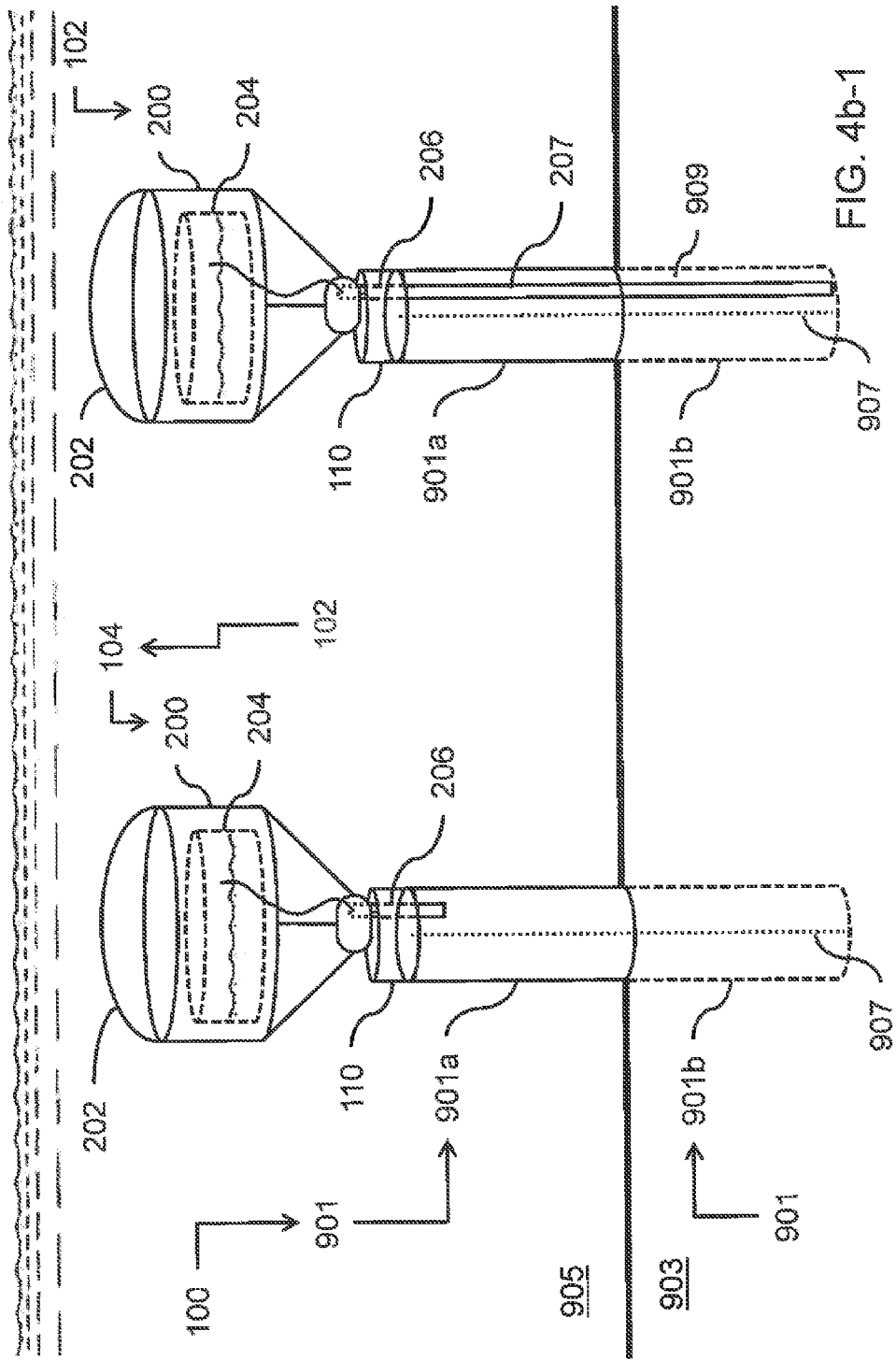

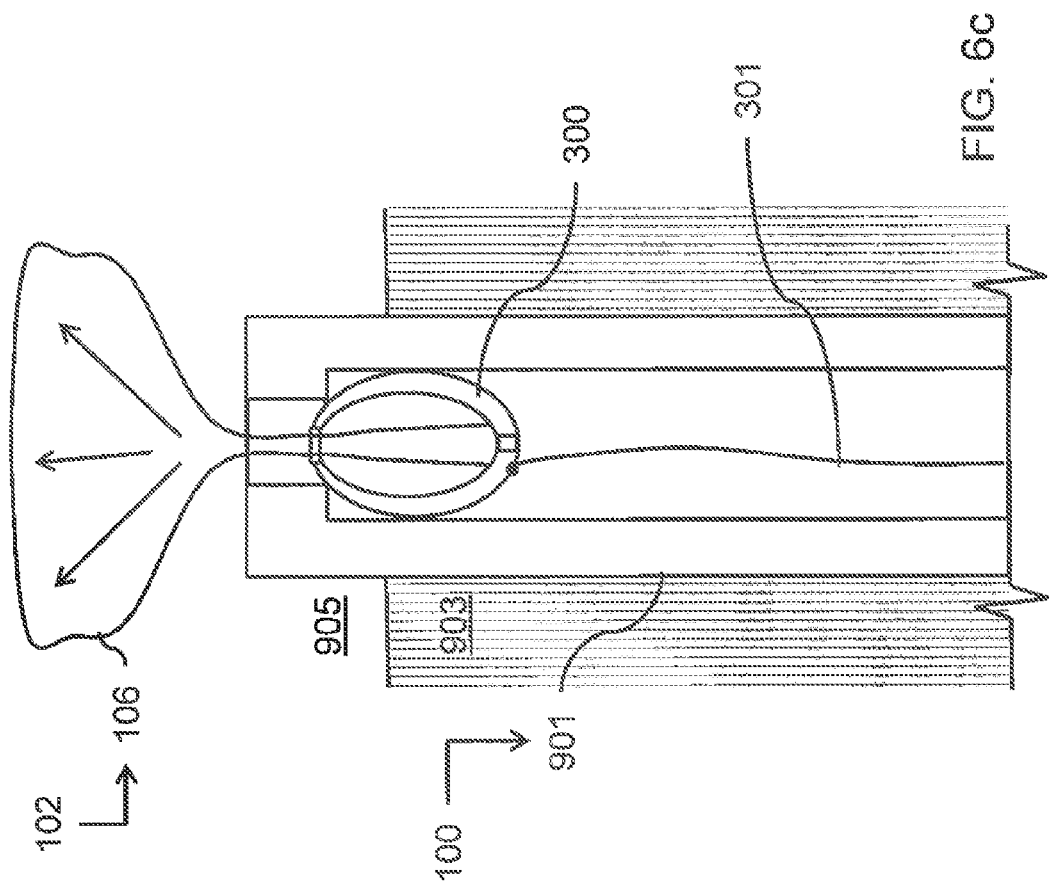

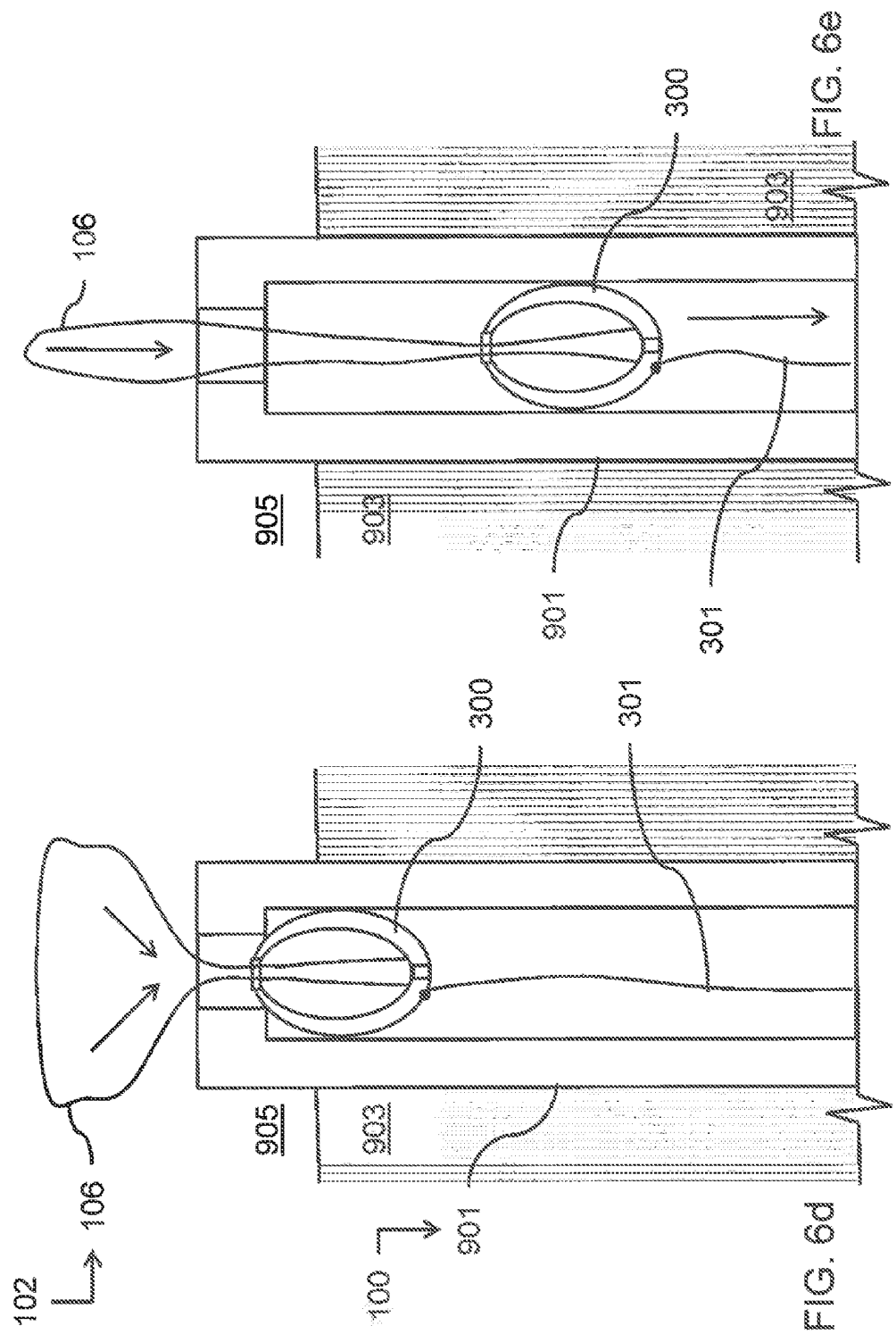

METHODS OF DEPLOYING AND OPERATING VARIABLE-BUOYANCY ASSEMBLY AND NON-COLLAPSIBLE FLUID-LINE ASSEMBLY FOR USE WITH FLUID-PROCESSING PLANT

TECHNICAL FIELD

Some aspects relate to (and are not limited to) an apparatus including a fluid-processing plant, a variable-buoyancy assembly, an underground fluid-line assembly, and methods associated therefor. More specifically, some aspects relate to (and are not limited to) an apparatus positionable relative to a shore section, an electric grid, and a body of water, and the apparatus includes a fluid-processing plant, a variable-buoyancy assembly, an underground fluid-line assembly, and methods associated therefor.

SUMMARY

Energy storage systems augment electrical grids by capturing excess (surplus) electric energy during periods of relatively lower demand on the electrical grid and storing the energy in other forms until demanded by the electric grid. Energy generated during periods of low energy demand (off-peak) is released to meet peak periods of higher demand load. For instance, compressed air storage provides a system configured to store electric energy generated at one time for use at another time by using compressed air (as an energy storage medium). Usage of compressed gas is beneficial to make intermittent sources of energy (such as, wind power or renewable energy generators) more usable by the electric grid.

For instance, buoyant balloon-like bags are positioned in a body of water (such as, a lake or an ocean). Electricity from the electric grid is consumed to operate an air compressor, which in turn fills the balloon-like bags with pressurized air. When the electric grid demands electricity, the pressurized air is taken from storage (emptied from the buoyant balloon-like bags), and is run through a turbo-expander assembly. The turbo-expander assembly uses the expanding air to drive a turbine. In this way, electricity is provided to the electric grid when demanded.

The challenge associated with constructing and installing offshore underwater storage of compressed air is the relatively high cost of marine construction (installation) due to using sophisticated marine construction systems and materials, and marine construction labour. Of course, other reasons for using the concepts disclosed herein may include expanding the construction schedule windows and potential sites since the concepts disclosed here in are less susceptible to wind conditions, wave conditions and boat traffic conditions since an underground fluid-line assembly, installed as disclosed, provides or facilitates the ballast to weigh down the variable buoyancy device, which reduces marine construction requirements.

It will be appreciated that there exists a need to mitigate (at least in part) at least one problem associated with constructing and/or operating an offshore storage systems for storage. For instance, such systems may be used to make intermittent sources of renewable energy more reliable or may help to optimize electrical grid infrastructure (e.g. transmission lines). After much study of the known systems and methods, an understanding of at least one problem and at least one solution is identified and is articulated as follows:

To mitigate, at least in part, at least one problem associated with the existing systems and/or methods, there is provided (in accordance with a major aspect) an apparatus. The apparatus is positionable relative to a shore section, an electric grid, and a body of water. The apparatus includes (and is not limited to) a fluid-processing plant, a variable-buoyancy assembly, and a fluid-line assembly. The fluid-processing plant is configured to be installed on the shore section. The fluid-processing plant is further configured to consume electricity (such as surplus electricity) provided by the electric grid to generate a pressurized fluid. It will be appreciated that the electric grid includes a set of electrical conductors that electrically connects the fluid-processing plant to an electric-generation source (such as, a wind turbine, a solar panel, a tidal generator, an electric turbine, etc.) and/or an electrical sink (a device configured to consume electricity). The fluid-processing plant is further configured to use an accumulated pressurized fluid to render demand electricity to be provided to the electric grid. The variable-buoyancy assembly is configured to be installed in the body of water. It will be appreciated that the fluid is compressed (pressurized) to slightly above the hydrostatic pressure found at depth (the position of the variable-buoyancy assembly in the water); there is relatively little pressure differential acting on the variable-buoyancy assembly when the variable-buoyancy assembly is positioned in the water. The variable-buoyancy assembly is further configured to accumulate the pressurized fluid generated by the fluid-processing plant while the fluid-processing plant consumes the electricity (such as surplus electricity) provided by the electric grid. The variable-buoyancy assembly is further configured to provide the accumulated pressurized fluid to the fluid-processing plant. This is done in such a way that the fluid-processing plant renders the accumulated pressurized fluid to generate the demand electricity to be provided to the electric grid. The underground non-collapsible fluid-line assembly is configured to be installed underground. The underground non-collapsible fluid-line assembly is further configured to facilitate pressurized fluid exchange between the fluid-processing plant and the variable-buoyancy assembly. The underground non-collapsible fluid-line assembly is further configured to ballast the variable-buoyancy assembly positioned in the body of water. This is done in such a way that the variable-buoyancy assembly remains in the body of water while the underground non-collapsible fluid-line assembly facilitates the pressurized fluid exchange.

To mitigate, at least in part, at least one problem associated with the existing systems and/or methods, there is provided (in accordance with a major aspect) a method. The method is for operating a fluid-processing plant, a variable-buoyancy assembly, and an underground non-collapsible fluid-line assembly. The fluid-processing plant is installed on a shore section. The variable-buoyancy assembly is installed in a body of water. The underground non-collapsible fluid-line assembly is installed underground. The method includes (and is not limited to) using the fluid-processing plant to consume electricity (such as surplus electricity) provided by the electric grid to generate a pressurized fluid. The method includes (and is not limited to) using the fluid-processing plant to use an accumulated pressurized fluid to render demand electricity to be provided to the electric grid. The method further includes using a variable-buoyancy assembly to accumulate the pressurized fluid generated by the fluid-processing plant while the fluid-processing plant consumes the electricity (such as surplus electricity) provided by the electric grid. The method further includes using a variable-buoyancy assembly to provide the accumulated pressurized fluid to the fluid-processing plant. This is done in such a way that the fluid-processing plant renders the accumulated pressurized fluid to generate the demand electricity to be provided to the electric grid. The method further includes using the underground non-collapsible fluid-line assembly to facilitate pressurized fluid exchange between the fluid-processing plant and the variable-buoyancy assembly. The method further includes using the underground non-collapsible fluid-line assembly to ballast the variable-buoyancy assembly positioned in the body of water. This is done in such a way that the variable-buoyancy assembly remains in the body of water while the underground non-collapsible fluid-line assembly facilitates the pressurized fluid exchange.

To mitigate, at least in part, at least one problem associated with the existing systems and/or methods, there is provided (in accordance with a major aspect) a method. The method is for deployment of a fluid-processing plant, a variable-buoyancy assembly, and an underground non-collapsible fluid-line assembly relative to a shore section, a body of water, and the ground. The method includes (and is not limited to) a first installation operation, a second installation operation, and a third installation operation (which are not necessarily completed in a sequential order or any particular order). The first installation operation includes installing the fluid-processing plant on the shore section. This is done in such a way that the fluid-processing plant is usable to consume electricity (such as surplus electricity) provided by the electric grid to generate a pressurized fluid. The first installation operation further includes installing the fluid-processing plant on the shore section. This is done in such a way that the fluid-processing plant is usable to use an accumulated pressurized fluid to render demand electricity to be provided to the electric grid. The second installation operation includes installing the underground non-collapsible fluid-line assembly under the ground. This is done in such a way that the underground non-collapsible fluid-line assembly is usable to facilitate pressurized fluid exchange between the fluid-processing plant and the variable-buoyancy assembly. The second installation operation further includes installing the underground non-collapsible fluid-line assembly under the ground. This is done in such a way that the underground non-collapsible fluid-line assembly is usable to ballast the variable-buoyancy assembly positioned in the body of water. This is done in such a way that the variable-buoyancy assembly remains in the body of water while the underground non-collapsible fluid-line assembly facilitates the pressurized fluid exchange. The third installation operation includes installing the variable-buoyancy assembly in the body of water. This is done in such a way that the variable-buoyancy assembly is usable to accumulate the pressurized fluid generated by the fluid-processing plant while the fluid-processing plant consumes the electricity (such as surplus electricity) provided by the electric grid. The third installation operation further includes installing the variable-buoyancy assembly in the body of water. This is done in such a way that the variable-buoyancy assembly is usable to provide the accumulated pressurized fluid to the fluid-processing plant. This is done in such a way that the fluid-processing plant renders the accumulated pressurized fluid to generate the demand electricity to be provided to the electric grid.

To mitigate, at least in part, at least one problem associated with the existing systems and/or methods, there is provided (in accordance with a major aspect) an apparatus. The apparatus is for use with the fluid-processing plant configured to generate and store the pressurized fluid. The fluid-processing plant is spaced apart from a body of water. The apparatus includes the variable-buoyancy assembly positioned in the body of water in such a way that a buoyancy force urges the variable-buoyancy assembly to move toward the top surface of the body of water. The apparatus also includes a non-collapsible fluid-line assembly positionally anchored, at least in part, underground in such a way that the non-collapsible fluid-line assembly extends, at least in part, into the body of water. The non-collapsible fluid-line assembly fluidly connects the fluid-processing plant and the variable-buoyancy assembly together in such a way that the non-collapsible fluid-line assembly conveys the pressurized fluid between the fluid-processing plant and the variable-buoyancy assembly. The non-collapsible fluid-line assembly transmits an anchoring force from the ground to the variable-buoyancy assembly; this is done in such a way that the anchoring force substantially counteracts, the buoyancy force acting on the non-collapsible fluid-line assembly. The anchoring force substantially urges the variable-buoyancy assembly to remain below the surface of the body of water. The arrangement of the apparatus reduces, at least in part, installation costs and/or construction costs and/or maintenance costs associated with the apparatus.

To mitigate, at least in part, at least one problem associated with the existing systems and/or methods, there is provided (in accordance with a major aspect) a method. The method is for operating the fluid-processing plant configured to generate and store the pressurized fluid (the fluid-processing plant is spaced apart from a body of water). The method includes: (A) positioning a variable-buoyancy assembly in the body of water in such a way that a buoyancy force urges the variable-buoyancy assembly to move toward the surface of the body of water; (B) positionally anchoring, at least in part, a non-collapsible fluid-line assembly underground in such a way that the non-collapsible fluid-line assembly extends, at least in part, into the body of water; (C) fluidly connecting, via the non-collapsible fluid-line assembly, the fluid-processing plant and the variable-buoyancy assembly together in such a way that the non-collapsible fluid-line assembly conveys the pressurized fluid between the fluid-processing plant and the variable-buoyancy assembly; and (D) transmitting an anchoring force, via the non-collapsible fluid-line assembly, from the ground to the variable-buoyancy assembly in such a way that the anchoring force substantially counteracts the buoyancy force acting on the non-collapsible fluid-line assembly, and the anchoring force substantially urges the variable-buoyancy assembly to remain below the surface of the body of water.

To mitigate, at least in part, at least one problem associated with the existing systems and/or methods, there is provided (in accordance with a major aspect) a method. The method is for deployment of the fluid-processing plant. The method includes: (A) positioning a variable-buoyancy assembly in the body of water in such a way that a buoyancy force urges the variable-buoyancy assembly to move toward the surface of the body of water; (B) positionally anchoring, at least in part, a non-collapsible fluid-line assembly underground in such a way that the non-collapsible fluid-line assembly extends, at least in part, into the body of water, and the non-collapsible fluid-line assembly being configured to fluidly connect the fluid-processing plant and the variable-buoyancy assembly together in such a way that the non-collapsible fluid-line assembly conveys the pressurized fluid between the fluid-processing plant and the variable-buoyancy assembly; and (C) transmitting an anchoring force, via the non-collapsible fluid-line assembly, from the ground to the variable-buoyancy assembly in such a way that the anchoring force substantially counteracts the buoyancy force acting on the non-collapsible fluid-line assembly, and the anchoring force substantially urges the variable-buoyancy assembly to remain below the surface of the body of water.

Other aspects are identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken with the accompanying drawings, in which:

FIGS. 2a to 2f (SHEETS 5 to 10 of 24 SHEETS) depict side views of embodiments of a first installation option for installing the apparatus 100 of any one of FIGS. 1a, 1b, 1c and 1d;

FIGS. 4a to 4d (SHEETS 16 to 19 of 24 SHEETS) depict side views of embodiments for operatively connecting an non-collapsible fluid-line assembly 901 to the variable-buoyancy assembly 102 for the apparatus 100 of any one of FIGS. 1a, 1b, 1c and 1d;

FIGS. 6a to 6e (SHEETS 21 to 23 of 24 SHEETS) depict side views of embodiments of a third installation option for installing the apparatus 100 of any one of FIGS. 1a, 1b, 1c and 1d.

Figure 1A:
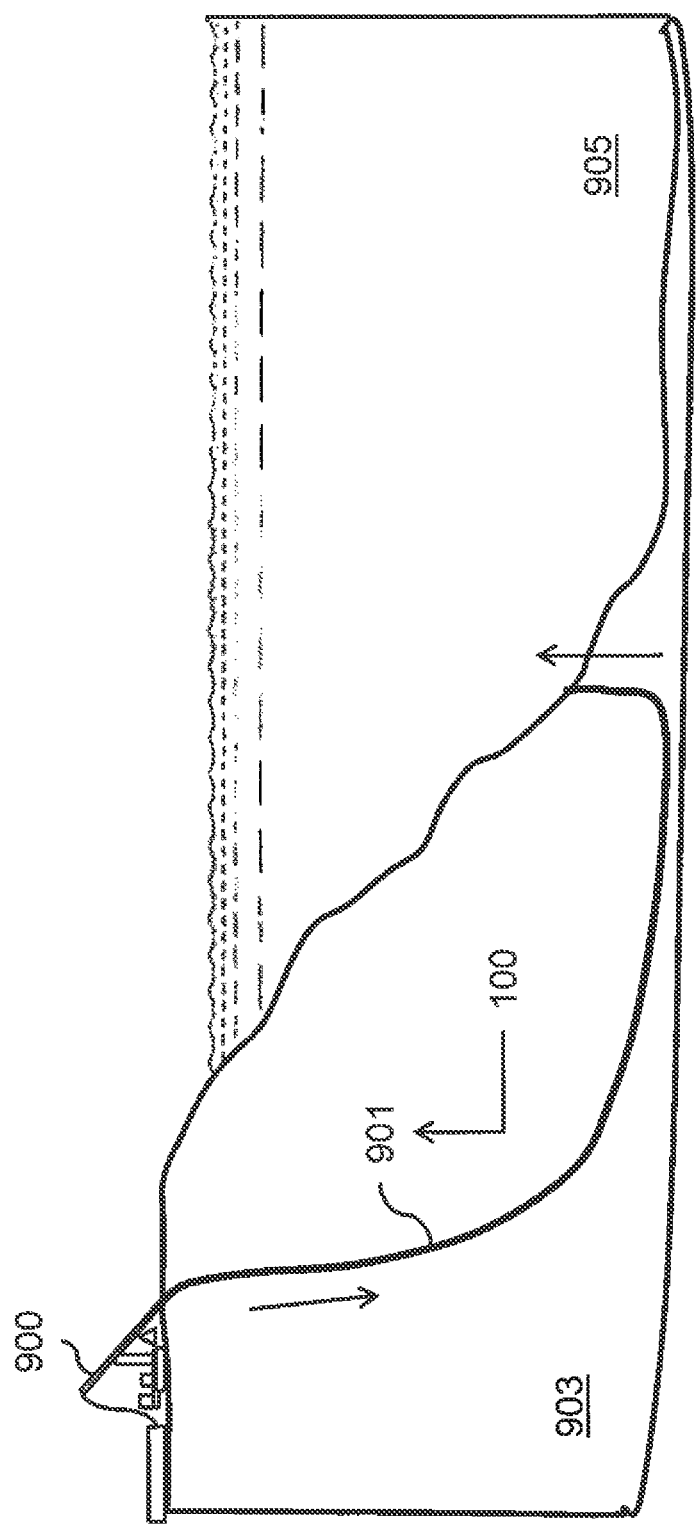
FIGS. 1a, 1b, 1c and 1d (SHEETS 1 to 4 of 24 SHEETS) depict side views of embodiments of an apparatus 100 positionable relative to a shore section 903, an electric grid 910, and a body of water 905.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the Drawings. Elements in the several figures are illustrated for simplicity and clarity and have not been drawn to scale. The dimensions of some of the elements in the figures may be emphasized relative to other elements for facilitating an understanding of the disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 100 apparatus
102 variable-buoyancy assembly
104 rigid frame assembly
106 flexible fabric assembly
108 floatation assembly
110 line connector
200 frame assembly
202 positive buoyant section
204 fluid cavity
206 fluid-transfer line
207 fluid conduit
208 stand pipe
300 pig assembly
301 pig line
900 fluid-line installation system
901 non-collapsible fluid-line assembly, or fluid-line assembly
901a above-ground fluid-line section
901b below-ground fluid-line section
901x first pipe section
901y second pipe section
902 fluid-processing plant
903 shore section
904 winch-and-mooring system
905 body of water
906 tugboat
907 connection cable
909 fluid conduit
910 electric grid
912 tracking transmitter

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIGS. 1a, 1b, 1c and 1d depict side views of embodiments of an apparatus 100 positionable relative to a shore section 903, an electric grid 910, and a body of water 905. The electric grid 910 is depicted in FIGS. 2e, 2f, 3e, 5 and 7. It will be appreciated that FIGS. 1a, 1b, 1c and 1d depict a fluid-line installation system 900, and do not depict a fluid-processing plant 902. The fluid-processing plant 902 is depicted in other FIGS. (where noted).

A fluid-line installation system 900 is positionable (positioned, deployed) next to the shore line of the body of water 905 (on the shore section 903). The fluid-line installation system 900 is configured to install a non-collapsible fluid-line assembly 901 (examples of which are depicted in FIGS. 1a to 1d). The non-collapsible fluid-line assembly 901 is hereafter referred to as the fluid-line assembly 901 (for the sake of convenience). It will be appreciated that the fluid-line assembly 901 is can be configured to: (A) convey a fluid (such as, air) and only fluid, or (B) house at least one or more pipes or conduits. For the case where the fluid-line assembly 901 is configured to house at least one or more pipes or conduits. The fluid-line assembly 901 may be configured to receive water while the conduits housed by the fluid-line assembly 901 may convey the pressurized fluid (if so desired). The fluid-line installation system 900 is also called a directional drilling system. The fluid-line installation system 900 is used (operated) to install (directionally drill) the fluid-line assembly 901 (as depicted). The fluid-line installation system 900 is configured to install the fluid-line assembly 901 in the shore section 903. This is done in such a way that the fluid-line assembly 901 is aligned to: (A) extend from the top surface of the shore section 903; (B) extend underground (bypassing the water positioned adjacent to the shore line); and (C) enter (emerge) into the body of water 905. The fluid-line assembly 901 enters the body of water 905 at a position located between the top surface of the body of water 905 and the bottom floor surface. The bottom floor surface is located beneath the body of water 905. Persons of skill in the art will understand that any installation method may be used to install the fluid-line assembly 901, and that the directional drilling operation (also called directional boring) of the fluid-line installation system 900 is a preferred installation method. Other installation methods for installing the fluid-line assembly 901 may include trenchless drilling, etc. Of course, it will be appreciated that there is an upper size limit for the diameter of the fluid-line assembly 901 to cost effectively install the fluid-line assembly 901. The fluid-line installation system 900 is configured to perform any type of drilling, directional drilling, boring, or technique to facilitate installation of (forming of) a hole for receiving the fluid-line assembly 901 (also called, a pipe or conduit, etc.). The fluid-line assembly 901 may be pushed or pulled through the hole, a drill bit may or may not be connected to the fluid-line assembly 901, a casing may or may not be installed as the hole that is being drilled, etc. The fluid-line assembly 901 (once installed) may change position before coming to a final location with a buoyant force applied to the fluid-line assembly 901. Additionally, the fluid-line assembly 901 may move slightly over time.

The apparatus 100 includes (and is not limited to) the fluid-line assembly 901. The fluid-line assembly 901 is installed and positioned relative to the body of water 905. The fluid-line assembly 901 is also called an airline, a pipeline, a fluid conduit, and any equivalent thereof. The fluid-line assembly 901 is installed, at least in part, in the shore section 903. The shore section 903 is located adjacent to, and abuts, the body of water 905. The shore section 903 is also called earth or ground. Once operatively installed, the fluid-line assembly 901 is held (maintained) in a secured stationary position (as depicted) by the weight of earth (such as a shore section 903) resting on the fluid-line assembly 901. It will be appreciated that the person of skill in the art would understand that there are many acceptable configurations for the fluid-line assembly 901. The fluid-line assembly 901 is configured to not collapse under the weight received from the shore section 903.

FIG. 1a depicts a side view of an embodiment of a first installation option for installing the fluid-line assembly 901 relative to the body of water 905.

Referring to the embodiment of FIG. 1a, the fluid-line installation system 900 is configured to install the fluid-line assembly 901 in the shore section 903. This is done in such a way that the fluid-line assembly 901 is aligned to: (A) extend from the top surface of the shore section 903 (at any desired angle); and (B) extend vertically (at least in part) from the shore section 903 and into the body of water 905. Persons of skill in the art would understand that the fluid-line assembly 901 may extend from the shore section 903 at any desired angle into the body of water 905.

Figure 1B:
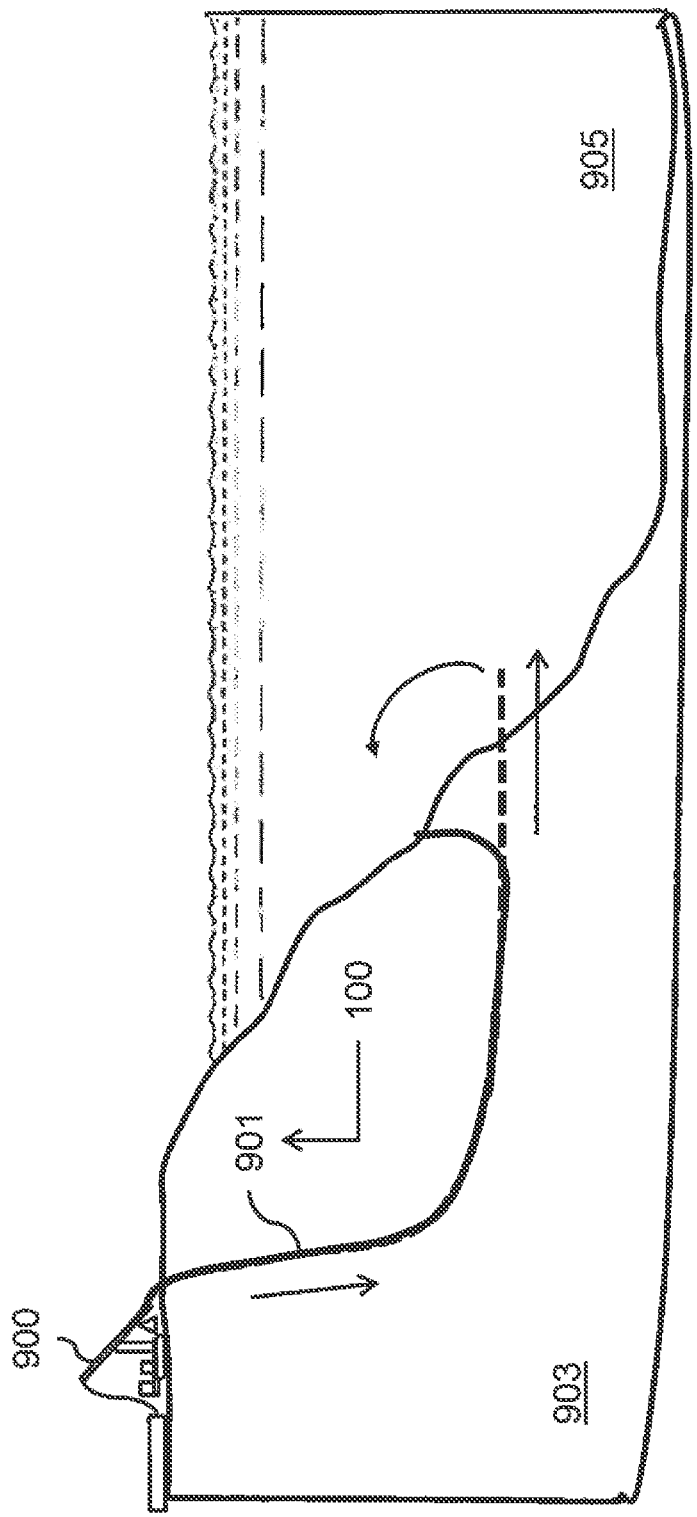

FIG. 1b depicts a side view of an embodiment of a second installation option for installing the fluid-line assembly 901 relative to the body of water 905.

Referring to the embodiment of FIG. 1b, the fluid-line installation system 900 is configured to install the fluid-line assembly 901 in the shore section 903. This is done in such a way that the fluid-line assembly 901 is aligned to: (A) extend from the top surface of the shore section 903; and (B) extend (substantially horizontally or any direction may be suitable) from the shore section 903 and into the body of water 905. The fluid-line assembly 901 is extended to egress in a substantially horizontal direction (any direction may be suitable) into the body of water 905. The fluid-line assembly 901 may be configured to bend and tear through (at least in part) the shore section 903 from the end closest to the body of water 905 where the soil overburden is the least. The bending of the fluid-line assembly 901 ends when the soil overburden is sufficient to resist the upward buoyancy force acting on the variable-buoyancy assembly 102. In this manner, the fluid-line assembly 901 may curve (become aligned substantially vertically (any direction may be suitable), and then stabilized in position). The end of the fluid-line assembly 901 may be aligned in a vertical direction (if so desired). For the case where the option, as depicted in FIG. 1b, is used to install the fluid-line assembly 901, the fluid-line assembly 901 may curve underground once the tensile forces, transmitted through the fluid-line assembly 901, have dissipated into the soil surrounding the fluid-line assembly 901.

Figure 1C:
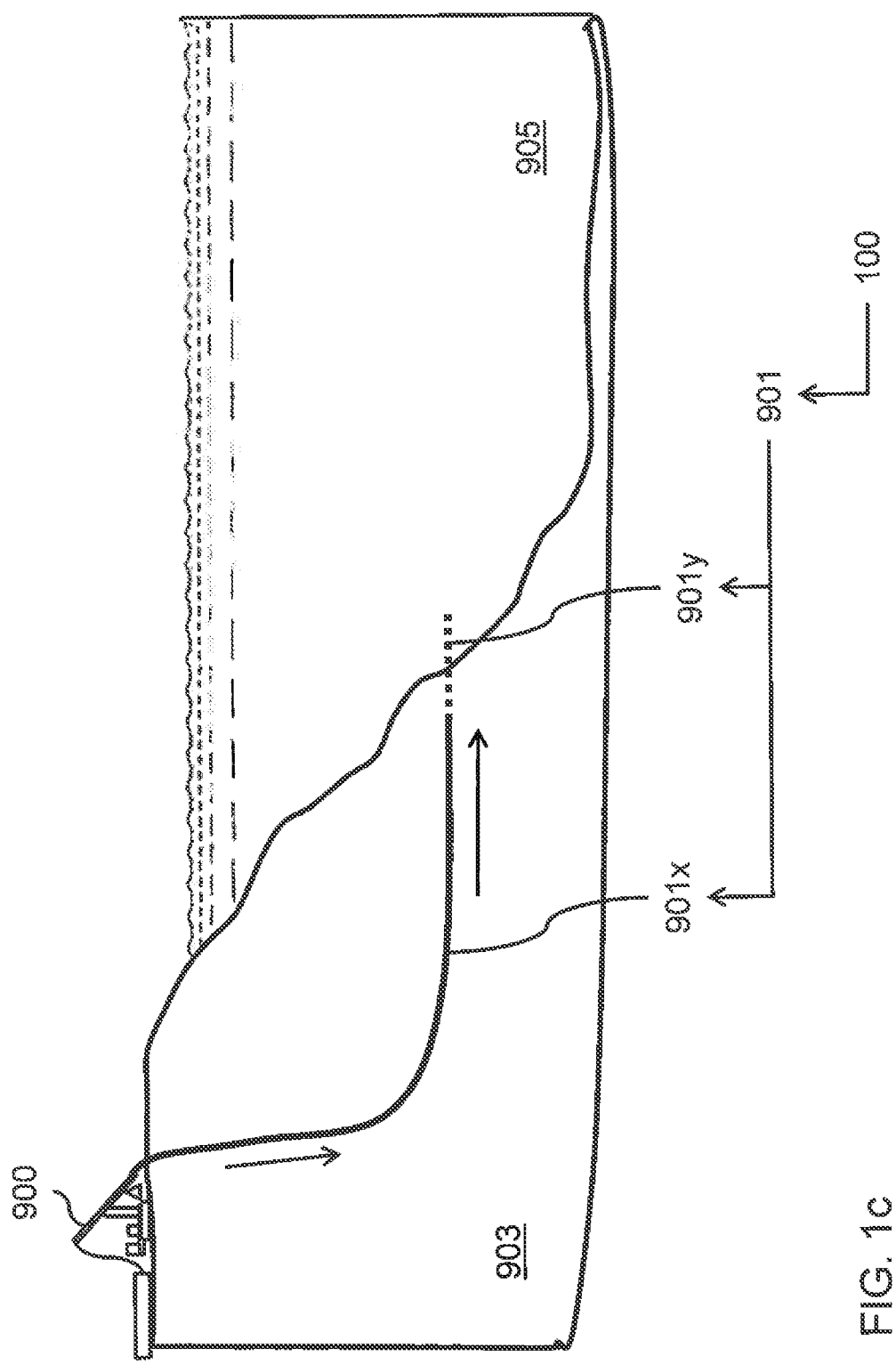

FIG. 1c depicts a side view of an embodiment of a third installation option (for the installation of an airline relative to a body of water 905).

Referring to the embodiment of FIG. 1e, the fluid-line assembly 901 includes a first pipe section 901x and a second pipe section 901y. The first pipe section 901x has a first material and/or a first wall thickness. The second pipe section 901y has a second material and/or a second wall thickness that is different from the first material (such as, a different structure, material, alloy, etc.), and/or wall thickness, and/or may be structurally reinforced to resist bending forces.

The second pipe section 901y is included in the last segment of the fluid-line assembly 901. The second pipe section 901y extends from the first pipe section 901x into the body of water 905. For this case, the second pipe section 901y does not bend to a vertical position, and remains extended (such as, horizontally extended) into the body of water 905. More specifically, the second pipe section 901y includes a material configured to resist bending from the substantially horizontally aligned position (any direction may be suitable) to a vertically aligned position, and remains horizontally extended into the body of water 905 (in response to the application of forces and/or loads to the fluid-line assembly 901).

Figure 1D:
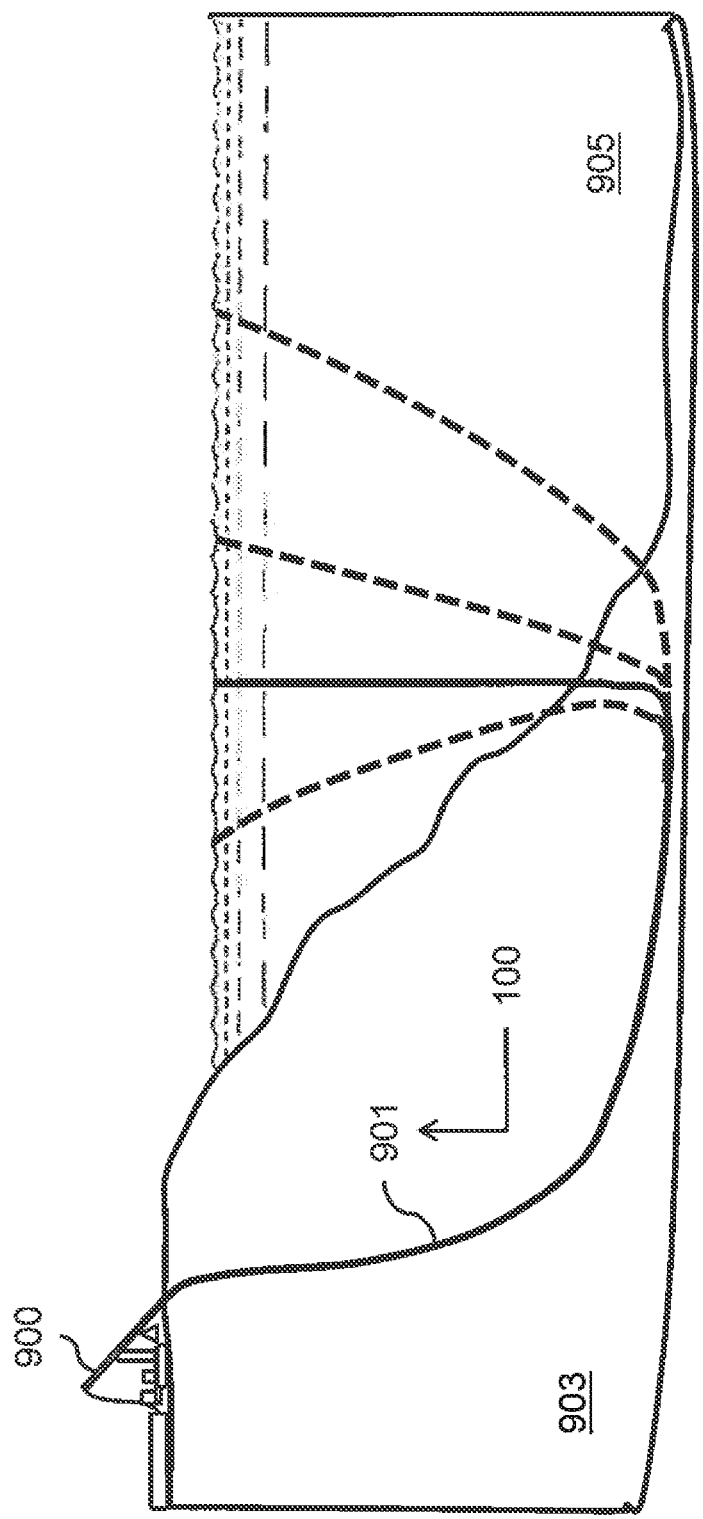

FIG. 1*d* depicts options or variations for the embodiments depicted in FIGS. 1*a*, 1*b* and/or 1*c*.

Referring to the embodiment of FIG. 1*d*, the options (as depicted) show the fluid-line assembly 901 egressing from the shore section 903 at any angle into the body of water 905.

FIGS. 2*a* to 2*f* depict side views of embodiments of a first installation option for installing the apparatus 100 of any one of FIGS. 1*a*, 1*b*, 1*c* and 1*d*.

The fluid-line installation system 900 (depicted in FIGS. 1*a* to 1*d*) is replaced with a fluid-processing plant 902 and a winch-and-mooring system 904 installed at an above-water terminal of the fluid-line assembly 901 located above the shore section 903 (on the shore line next to the body of water 905). The shore line defines, at least in part, an outer perimeter of the body of water 905 having a top surface spaced apart from a bottom floor surface.

The fluid-line assembly 901 extends (buried under earth) from the fluid-processing plant 902, and enters into the body of water 905 from below the surface of the body of water 905. The fluid-line assembly 901 is to be operatively connected to a variable-buoyancy assembly 102. The variable-buoyancy assembly 102 is configured to be: (A) positionable in the body of water 905; and (B) buoyant in water (once installed). The fluid-line assembly 901 is configured to connect (fluidly connect) the fluid-processing plant 902 with the variable-buoyancy assembly 102 (once the variable-buoyancy assembly 102 is operationally installed in the body of water 905, as depicted in FIG. 2*e*). The fluid-line assembly 901 is configured to exchange (convey) a pressurized fluid (such as compressed air) between the fluid-processing plant 902 and the variable-buoyancy assembly 102 (once operationally installed as depicted in FIG. 2*e*). The fluid-line assembly 901 is configured to ballast the variable-buoyancy assembly 102 once the variable-buoyancy assembly 102 is operatively connected to the fluid-line assembly 901 (either directly or indirectly securely connected).

FIG. 2*a*-1 depicts a side view of an embodiment of a connection cable 907 of the winch-and-mooring system 904. The connection cable 907 of the winch-and-mooring system 904 extends along the interior of the fluid-line assembly 901 (between the above-ground terminal to the below-water terminal of the fluid-line assembly 901).

The connection cable 907 is connected to a floatation assembly 108 that is operatively received in the interior of the fluid-line assembly 901. The floatation assembly 108 is configured to float or to have buoyancy (once placed in the body of water 905). The floatation assembly 108 is inserted into the fluid-line assembly 901 at the winch-and-mooring system 904. The fluid-processing plant 902 fluidly pressurizes the fluid-line assembly 901 in such a way that the floatation assembly 108 is urged to move from the fluid-processing plant 902 toward the body of water 905 along the interior of the fluid-line assembly 901. The fluid pressure in the interior of the fluid-line assembly 901 is increased to where the internal fluid pressure urges the floatation assembly 108 to move along the fluid-line assembly 901 from the above-ground terminal of the fluid-line assembly 901 located on shore to the below-water terminal located in the body of water 905. The floatation assembly 108 is passed through the fluid-line assembly 901 from the fluid-processing plant 902 toward the body of water 905 (in response to increasing fluid pressure in the fluid-line assembly 901). The pressurized fluid (such as, compressed air) is used to push the floatation assembly 108 through the fluid-line assembly 901. The floatation assembly 108 exits the below-water terminal of the fluid-line assembly 901 (located in the body of water 905). Once the floatation assembly 108 exists from the fluid-line assembly 901, the floatation assembly 108 floats to the surface of the body of water 905, and brings the connection cable 907 along (to the water surface). It will be appreciated that the winch-and-mooring system 904 does not apply tension to the connection cable 907 while the floatation assembly 108 floats to the surface of the water.

The passage of the floatation assembly 108 through the fluid-line assembly 901 is similar to the passage of a pig through a pipeline. Pigging in pipelines refers to the practice of moving devices (known as pigs) through a pipeline. This is accomplished by inserting the pig into a pig launcher (or a launching station) that has an oversized section in the pipeline that reduces to a nominal diameter. The launcher is then closed, and the pressure-driven flow of fluid along the fluid-line assembly 901 pushes the floatation assembly 108 along the fluid-line assembly 901 until the floatation assembly 108 exists the below-water terminal of the fluid-line assembly 901 located in the body of water 905.

Once in the body of water 905, the floatation assembly 108 floats to the surface of the body of water 905. The floatation assembly 108 may include a tracking transmitter 912 configured to broadcast a radio signal detectable by a directional antenna. In this way, movement of the floatation assembly 108 may be tracked. The tracking transmitter 912 is configured to broadcast a radio signal which can be detected by a directional antenna. By rotating the directional antenna, an operator can determine the direction the signal. The tracking transmitter 912 can broadcast a radio signal or another reasonable method for tracking (e.g. sonar).

Referring to the embodiment depicted in FIG. 2*a*, a tugboat 906 hauls (tugs) the variable-buoyancy assembly 102 to a position where the floatation assembly 108 will eventually rise to the surface of the body of water 905. It will be appreciated that persons of skill in the art would understand that there are many configurations for the variable-buoyancy assembly 102 that may be deployed. For instance, the variable-buoyancy assembly 102 is also called an air cavity assembly (and any equivalent thereof). The variable-buoyancy assembly 102 is configured to store (supply, accumulate) the pressurized fluid (to be accumulated or available for future use) once operatively installed, as depicted in FIG. 2*e*. The variable-buoyancy assembly 102 is depicted as a rigid frame assembly 104.

The variable-buoyancy assembly 102 includes a line connector 110. The line connector 110 is configured to securely connect to the connection cable 907 extending from the under-water terminal of the fluid-line assembly 901. The line connector 110 is also called a pipeline connector. The connection cable 907 is pulled in such a way as to move the line connector 110 to the under-water terminal of the non-collapsible fluid-line assembly 901 (as depicted in FIGS. 2*c* and 2*d*). The line connector 110 is configured to be operatively received by the under-water terminal of the fluid-line assembly 901 in the body of water 905 (once positioned to do just so, as indicated in FIG. 2*e*). The line connector 110 is configured to permit a passage of pressurized fluid between the variable-buoyancy assembly 102 and the fluid-line assembly 901 while the line connector 110 remains operatively sealed (connected) to the under-water terminal of the fluid-line assembly 901.

Referring to FIG. 2a, once the floatation assembly 108 exists the under-water terminal of the non-collapsible fluid-line assembly 901, the floatation assembly 108 rises (floats) to the surface of the body of water 905.

Figure 2B:
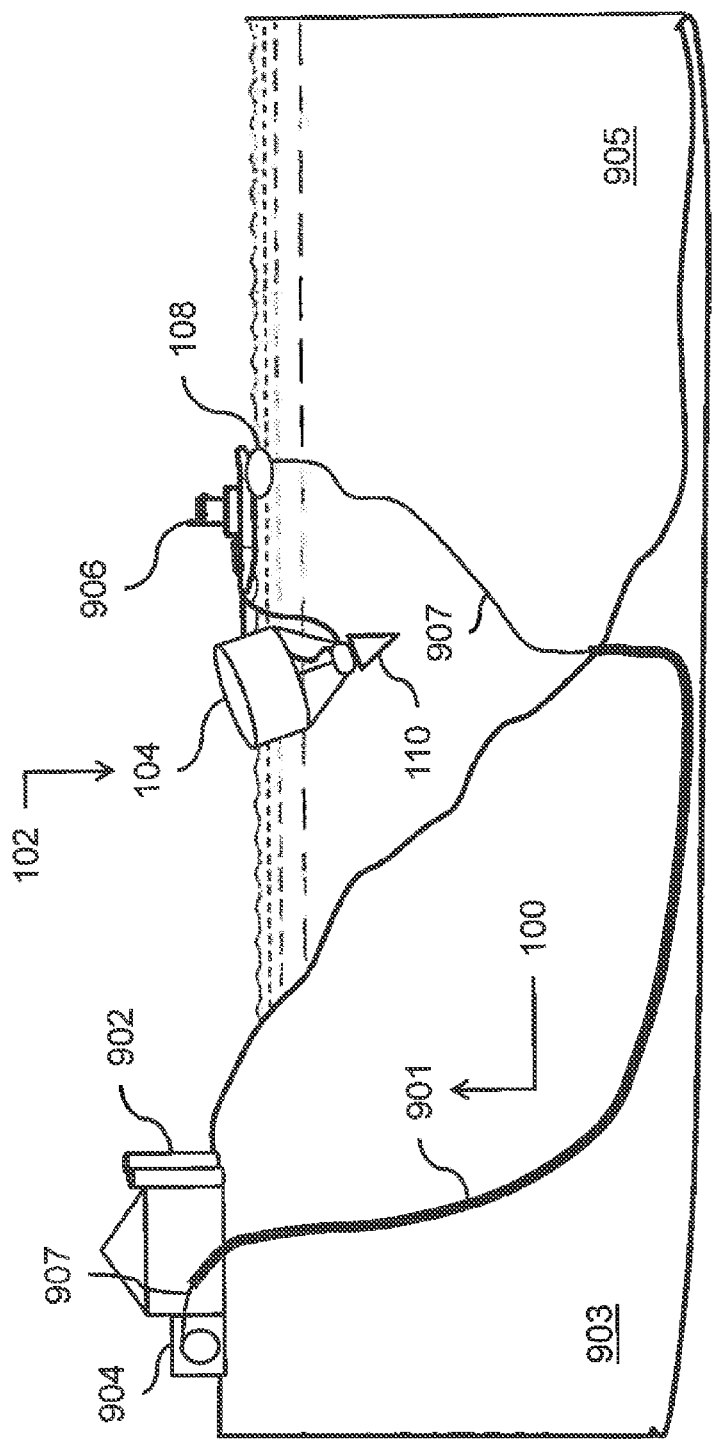
Figure 2C:
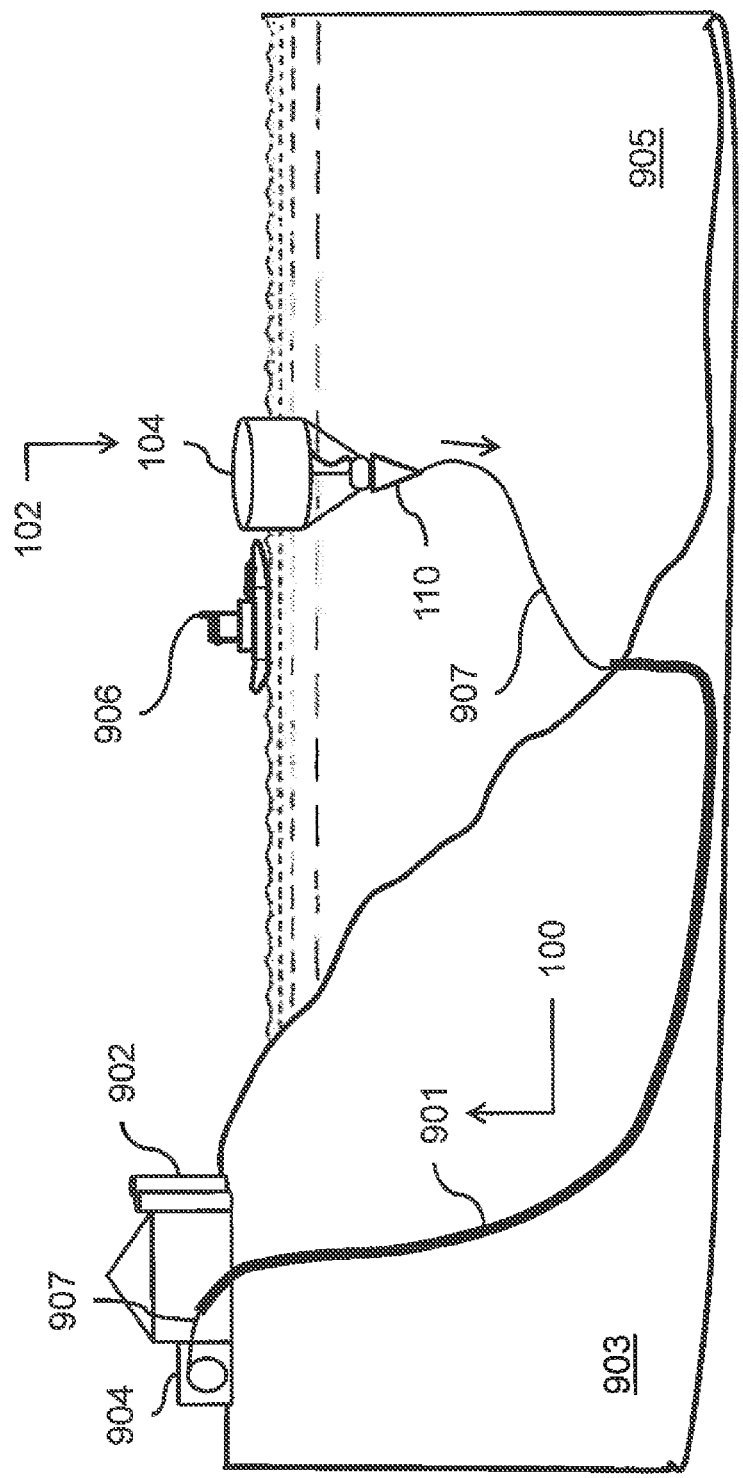
Figure 2D:
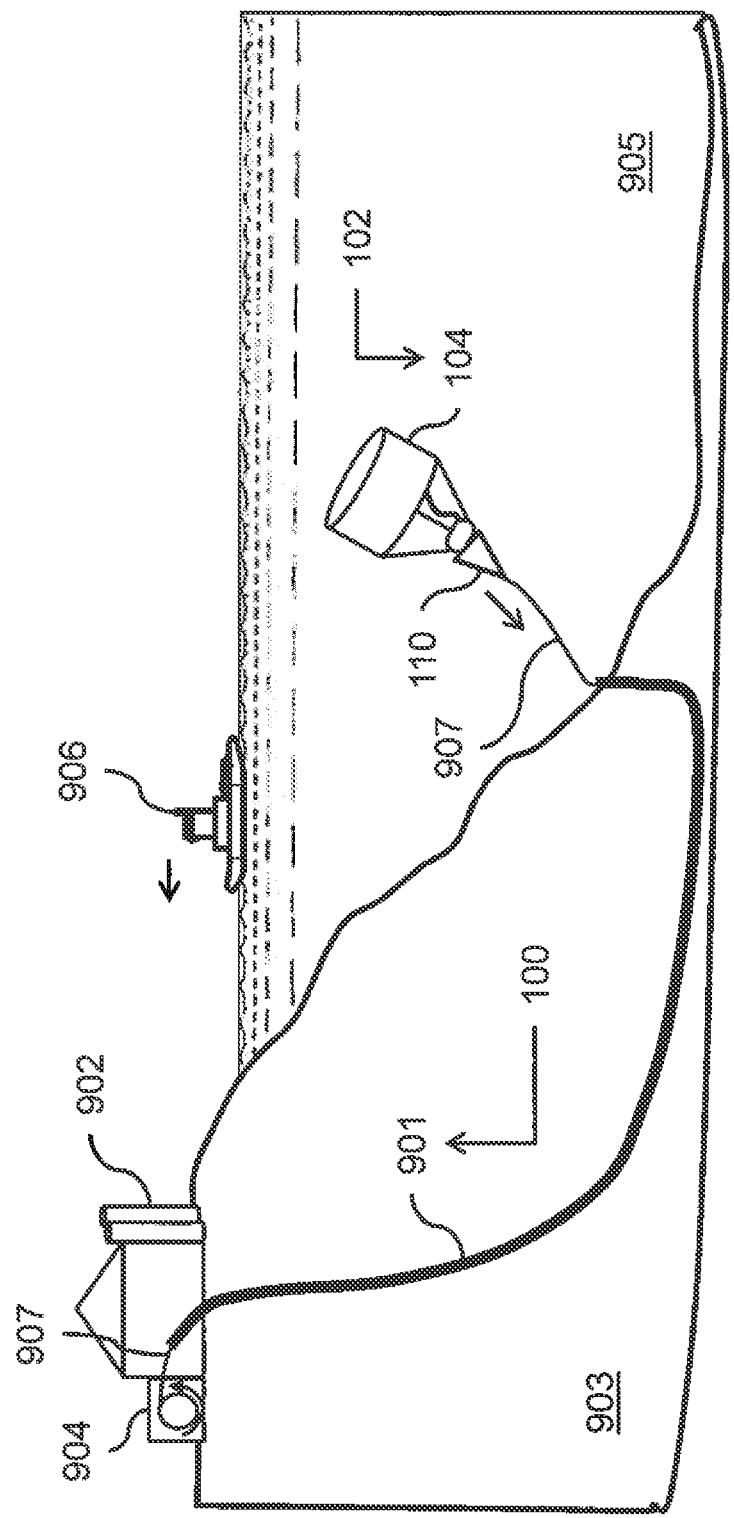
Figure 2E:
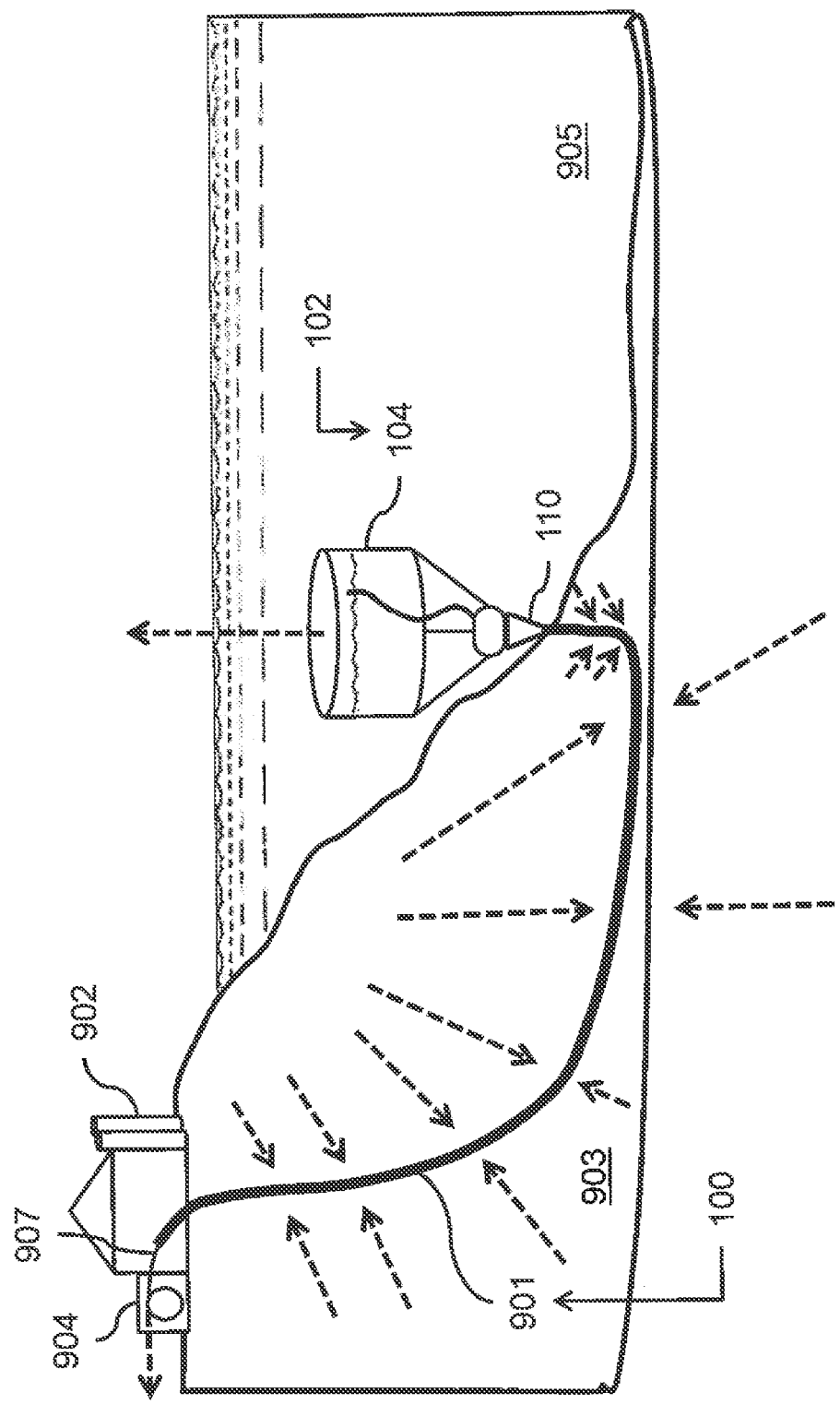

Referring to FIG. 2b, the floatation assembly 108 rises to the water surface. The tugboat 906 hauls the variable-buoyancy assembly 102 to the place where the floatation assembly 108 has risen to the surface of the body of water 905. The line connector 110 is operatively installed to the variable-buoyancy assembly 102.

Referring to FIG. 2c, the floatation assembly 108 is disconnected (detached) and removed from the connection cable 907 after the line connector 110 is attached to the connection cable 907. The connection cable 907 is operatively attached to the line connector 110, and the line connector 110 is operatively attached to the variable-buoyancy assembly 102. Once a connection is made between the connection cable 907 and the line connector 110, the winch-and-mooring system 904 is activated to (is configured to): (A) operatively haul (move) the line connector 110 to the under-water terminal of the fluid-line assembly 901 (depicted in FIG. 2d); and (B) maintain the variable-buoyancy assembly 102 in a substantially stable position in the body of water 905 (once hauled to the position as depicted in FIG. 2e).

Referring to the embodiment depicted in FIG. 2c, the winch-and-mooring system 904 is configured to haul in the connection cable 907 with the variable-buoyancy assembly 102 having the line connector 110 attached to the connection cable 907. The line connector 110 will be connected to the under-water terminal of the fluid-line assembly 901.

Referring to the embodiment depicted in FIG. 2d, the floatation assembly 108 depicted in FIG. 2c has been removed. The tugboat 906 moves back to the shore line. The winch-and-mooring system 904 is activated to haul in the connection cable 907 so that the line connector 110 is hauled toward the under-water terminal of the fluid-line assembly 901.

FIG. 2e depicts the fluid-line assembly 901 placed in tension with the variable-buoyancy assembly 102. Referring to the embodiment depicted in FIG. 2e, after the fluid-line assembly 901 is installed in the shore section 903, the fluid-processing plant 902 and the winch-and-mooring system 904 are installed (as depicted). The winch-and-mooring system 904 is positioned adjacent to the fluid-processing plant 902. The winch-and-mooring system 904 is configured to apply tension to the connection cable 907 positioned in the fluid-line assembly 901. The fluid-processing plant 902 is operatively connected to the fluid-line assembly 901. This is done in such a way as to operatively pressurize the interior of the fluid-line assembly 901. The fluid-processing plant 902 may include a fluid compressor, an air compressor, compressed air energy storage, etc. In accordance with an option, the winch-and-mooring system 904 is configured to take on a full load or a partial load from the variable-buoyancy assembly 102. It will be appreciated in accordance with an option, the winch-and-mooring system 904 may take no load from the variable-buoyancy assembly 102 (if desired).

The connection cable 907 is retracted (hauled in) by the winch-and-mooring system 904. The variable-buoyancy assembly 102 is hauled toward the under-water terminal of the fluid-line assembly 901. Once the line connector 110 reaches the under-water terminal of the fluid-line assembly 901, a seal is set up between the under-water terminal of the fluid-line assembly 901 and the line connector 110 (once the line connector 110 is forcibly urged into contact with the opening of the under-water terminal of the fluid-line assembly 901). Once the under-water terminal of the fluid-line assembly 901 is sealed, the fluid-processing plant 902 may operatively pressurize the section of the fluid-line assembly 901 between the line connector 110 at the under-water terminal and the above-ground terminal of the fluid-line assembly 901.

The variable-buoyancy assembly 102 is positioned in the body of water 905 between the water surface of the body of water 905 and the bottom floor surface (located beneath the body of water 905). Movement of the variable-buoyancy assembly 102 is limited within the body of water 905 (once operatively installed for operation).

As depicted, the fluid-line assembly 901 is installed so that the fluid-line assembly 901 egresses from the shore section 903 in a substantially vertical direction (any direction may be suitable). This is done in such a way that the fluid-line assembly 901 is in tension once the variable-buoyancy assembly 102 is installed to the terminal of the fluid-line assembly 901 (as depicted in FIG. 2e). The connection cable 907 is configured to keep the line connector 110 in a secured position with the entrance of the under-water terminal of the fluid-line assembly 901. A sealing element (such as, a rubber portion) may be placed between the line connector 110 and the under-water terminal of the fluid-line assembly 901 (if so desired). It will be appreciated that there is a limit for the amount of force the fluid-line assembly 901 may convey to hold the variable-buoyancy assembly 102 in a fixed position (steady position) in the body of water 905. The fluid-processing plant 902 is positioned relative to the electric grid 910 and to the shore line. The fluid-processing plant 902 is configured to consume electricity (such as, surplus electricity) to generate (create) compressed air to be stored under water in the variable-buoyancy assembly 102 at hydrostatic pressure.

Referring to the embodiment depicted in FIG. 2e, in accordance with a first option, the winch-and-mooring system 904 may be configured to lock the line connector 110 to the under-water terminal of the fluid-line assembly 901 (and make a seal between the line connector 110 and the under-water terminal); alternative locking mechanisms include sonar signals, manual switches activated by remotely operated vehicles, and any equivalent thereof. The tension in the connection cable 907 may be relaxed since the lock and seal are activated (via the line connector 110). For instance, the seal and lock can be de-activated from the winch-and-mooring system 904 (such as, by pulling the connection cable 907 into tension when pressurized fluid (such as, compressed air) is conveyed to the variable-buoyancy assembly 102). Specifically, operations include: (A) locking the line connector 110 to the under-water terminal of the fluid-line assembly 901; (B) making a seal between the line connector 110 and the under-water terminal, and the line connector 110 which transfers the buoyancy force to the fluid-line assembly 901; and (C) relaxing tension in the connection cable 907 is relaxed once the lock and seal are activated via the line connector 110.

Referring to the embodiment depicted in FIG. 2e, in accordance with a second option, the winch-and-mooring system 904 keeps the connection cable 907 in constant tension. This arrangement maintains the variable-buoyancy assembly 102 in a stationary under-water position, and maintains the fluid seal at the under-water terminal of the fluid-line assembly 901. In this case, the forces are passed to the shore section 903 through the fluid-line assembly 901. A force is also countered at the winch-and-mooring system 904. It will be appreciated that the connection cable 907 then transfers a force to the soil at any one of the winch and winch-and-mooring system 904 and/or via the fluid-line assembly 901.

The soil covers the fluid-line assembly 901, and assists the fluid-line assembly 901 to ballast (hold) the variable-buoyancy assembly 102 operatively positioned in the body of water 905 (to reduce installation costs and/or construction costs and/or maintenance costs). The upward buoyancy force from the variable-buoyancy assembly 102 is counteracted by the force of the shore section 903 pressing the fluid-line assembly 901 to a stationary position, and in part from the force of the winch-and-mooring system 904.

Referring to FIG. 2e, the variable-buoyancy assembly 102 may be (at any suitable time) raised to the surface of the body of water 905 for maintenance and/or inspection. Once maintenance is completed), the variable-buoyancy assembly 102 is re-lowered and re-locked into place (as depicted in FIG. 2e). For example, a sonar source is configured to issue a sonar pulse to be transmitted to the line connector 110. The sonar source is no depicted (and is known), and is positioned, for example, on the shore, at the fluid-processing plant 902 or on the tugboat 906 (depicted in FIG. 2d) positioned on the surface of the body of water 905. The line connector 110 is configured to be responsive to the sonar signal received from the sonar source. The sonar pulse is configured to urge the line connector 110 to disengage from the variable-buoyancy assembly 102. Once disengaged, the winch-and-mooring system 904 slowly releases the connection cable 907 in such a way that the variable-buoyancy assembly 102 may raise toward the surface. Once raised to the surface of the body of water 905, the variable-buoyancy assembly 102 is maintained and/or inspected (as needed). Once maintenance is completed, the variable-buoyancy assembly 102 may be substantially deflated, and then the winch-and-mooring system 904 uses the connection cable 907 to drag the variable-buoyancy assembly 102 back to the position depicted in FIG. 2e. For example, the sonar device may issue another sonar signal having a sonar command to the line connector 110 in such a way that the line connector 110 becomes lockably secured to the terminal end of the fluid-line assembly 901 (as depicted in FIG. 2e). Once locked in position, normal operations may resume. It will be appreciated that the line connector 110 is configured to be remotely actuated (via the sonar device) or locally actuated (via a mechanical device or manual release mechanism, etc.) to release and re-engage so that the variable-buoyancy assembly 102 can be raised to the surface for inspection and maintenance. The winch and winch-and-mooring system 904 along with connection cable 907 are used to control the assent and decent of the of the variable-buoyancy assembly 102 when the line connector 110 is not engaged.

Apparatus 100

It will be appreciated that the following description of the apparatus 100 applies to FIG. 2e (as well as to FIGS. 2f, 3e, 5 and 7). The apparatus 100 is positionable relative to the shore section 903, the electric grid 910, and the body of water 905. The apparatus 100 includes (and is not limited to) the fluid-processing plant 902, the variable-buoyancy assembly 102, and the fluid-line assembly 901.

The fluid-processing plant 902 is configured to be installed on the shore section 903. The fluid-processing plant 902 is further configured to consume electricity (such as surplus electricity) provided by the electric grid 910 to generate a pressurized fluid. The fluid-processing plant 902 is further configured to use an accumulated pressurized fluid to render demand electricity to be provided to the electric grid 910.

The variable-buoyancy assembly 102 is configured to be installed in the body of water 905. The variable-buoyancy assembly 102 is further configured to accumulate the pressurized fluid generated by the fluid-processing plant 902 while the fluid-processing plant 902 consumes the electricity (such as surplus electricity) provided by the electric grid 910. The variable-buoyancy assembly 102 is further configured to provide the accumulated pressurized fluid to the fluid-processing plant 902. This is done in such a way that the fluid-processing plant 902 renders the accumulated pressurized fluid to generate the demand electricity to be provided to the electric grid 910.

The fluid-line assembly 901 is configured to be installed underground. The fluid-line assembly 901 is further configured to facilitate pressurized fluid exchange between the fluid-processing plant 902 and the variable-buoyancy assembly 102. The fluid-line assembly 901 is further configured to ballast the variable-buoyancy assembly 102 positioned in the body of water 905. This is done in such a way that the variable-buoyancy assembly 102 remains in the body of water 905 while the fluid-line assembly 901 facilitates pressurized fluid exchange.

Method of Operation of Apparatus 100

It will be appreciated that the following description of the method of the operation of the apparatus 100 applies to FIG. 2e (as well as to FIGS. 2f, 3e, 5 and 7). The method is for operating the fluid-processing plant 902, the variable-buoyancy assembly 102, and the fluid-line assembly 901. The fluid-processing plant 902 is installed on a shore section 903. The variable-buoyancy assembly 102 is installed in a body of water 905. The fluid-line assembly 901 is installed underground.

The method includes (and is not limited to) using the fluid-processing plant 902 to consume electricity (such as surplus electricity) provided by the electric grid 910 to generate a pressurized fluid. The method further includes using the fluid-processing plant 902 to use an accumulated pressurized fluid to render demand electricity to be provided to the electric grid 910.

The method further includes using the variable-buoyancy assembly 102 to accumulate the pressurized fluid generated by the fluid-processing plant 902 while the fluid-processing plant 902 consumes the electricity (such as surplus electricity) provided by the electric grid 910. The method further includes using the variable-buoyancy assembly 102 to provide the accumulated pressurized fluid to the fluid-processing plant 902. This is done in such a way that the fluid-processing plant 902 renders the accumulated pressurized fluid to generate the demand electricity to be provided to the electric grid 910.

The method further includes using the fluid-line assembly 901 to facilitate pressurized fluid exchange between the fluid-processing plant 902 and the variable-buoyancy assembly 102. The method further includes using the fluid-line assembly 901 to ballast the variable-buoyancy assembly 102 positioned in the body of water 905. This is done in such a way that the variable-buoyancy assembly 102 remains in the body of water 905 while the fluid-line assembly 901 facilitates pressurized fluid exchange.

Method of Deployment of Apparatus 100

It will be appreciated that the following description of the method of deployment of the apparatus 100 applies to FIG. 2e (as well as to FIGS. 2f, 3e, 5 and 7). The method is for the deployment of the fluid-processing plant 902, the variable-buoyancy assembly 102, and the fluid-line assembly 901 relative to the shore section 903, the body of water 905, and the ground. The method includes (and is not limited to)

a first installation operation, a second installation operation, and a third installation operation.

The first installation operation includes installing the fluid-processing plant 902 on the shore section 903. This is done in such a way that the fluid-processing plant 902 is configured to consume electricity (such as surplus electricity) provided by the electric grid 910 (in order to generate a pressurized fluid). The first installation operation further includes installing the fluid-processing plant 902 on the shore section 903. This is done in such a way that the fluid-processing plant 902 is usable to use an accumulated pressurized fluid to render demand electricity to be provided to the electric grid 910.

The second installation operation includes installing the fluid-line assembly 901 under the ground. This is done in such a way that the fluid-line assembly 901 is usable to facilitate pressurized fluid exchange between the fluid-processing plant 902 and the variable-buoyancy assembly 102. The third installation operation further includes installing the fluid-line assembly 901 under the ground. This is done in such a way that the fluid-line assembly 901 is usable to ballast the variable-buoyancy assembly 102 positioned in the body of water 905. This is done in such a way that the variable-buoyancy assembly 102 remains in the body of water 905 while the fluid-line assembly 901 facilitates pressurized fluid exchange.

For example, the non-collapsible fluid-line assembly 901 is configured to: (A) be installed underground; (B) facilitate pressurized fluid exchange between the fluid-processing plant 902 and the variable-buoyancy assembly 102; and (C) substantially ballast the variable-buoyancy assembly 102 positioned in the body of water 905. This is done in such a way that the variable-buoyancy assembly 102 when filled and/or drained with the pressurized fluid (the buoyant fluid) remains submerged at a substantially similar depth in the body of water 905 while the non-collapsible fluid-line assembly 901 facilitates pressurized fluid exchange.

The third installation operation includes installing the variable-buoyancy assembly 102 in the body of water 905. This is done in such a way that the variable-buoyancy assembly 102 is usable to accumulate the pressurized fluid generated by the fluid-processing plant 902 while the fluid-processing plant 902 consumes the electricity (such as surplus electricity) provided by the electric grid 910. The third installation operation further includes installing the variable-buoyancy assembly 102 in the body of water 905. This is done in such a way that the variable-buoyancy assembly 102 is usable to provide the accumulated pressurized fluid to the fluid-processing plant 902. This is done in such a way that the fluid-processing plant 902 renders the accumulated pressurized fluid to generate the demand electricity to be provided to the electric grid 910.

Figure 2F:
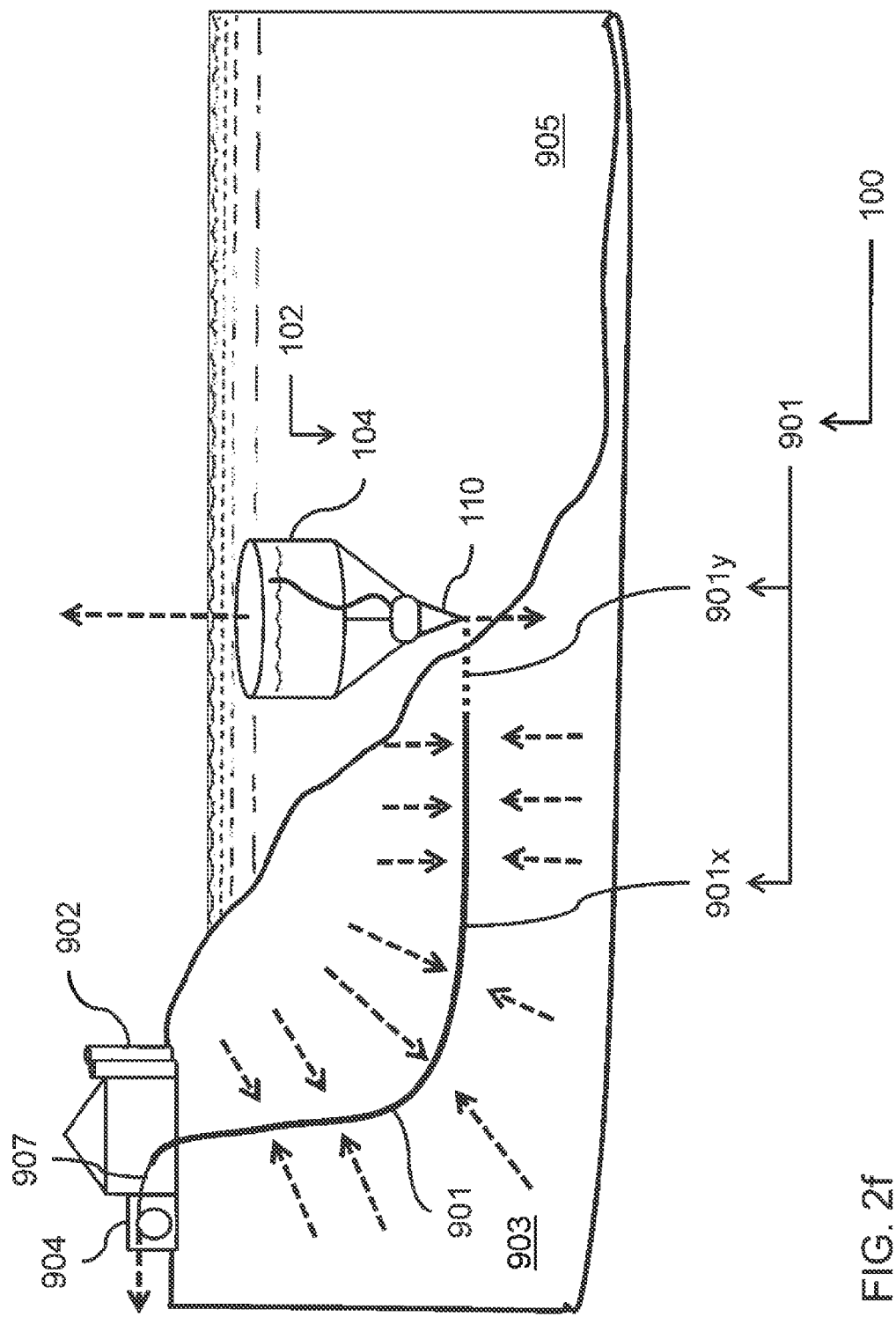

Referring to the embodiment depicted in FIG. 2f, the installation option associated with the third installation option of FIG. 1c is depicted. The forces acting on the variable-buoyancy assembly 102 and the fluid-line assembly 901 are shown. The upward buoyancy force from the variable-buoyancy assembly 102 is counteracted by the force of the shore section 903 that presses down on the fluid-line assembly 901, and in part from the force of the winch-and-mooring system 904. In accordance with the depicted option, the fluid-line assembly 901 egresses substantially horizontally (any direction may be suitable) from the shore section 903 into the body of water 905. The fluid-line assembly 901 includes a first pipe section 901x and a second pipe section 901y. The first pipe section 901x has a first material. The second pipe section 901y has a second material that is different from the first material (such as, a different structure, material, alloy, etc.) The second pipe section 901y is included in the last segment of the fluid-line assembly 901. The second pipe section 901y extends from the first pipe section 901x into the body of water 905. The second pipe section 901y includes a material configured to: (A) resist bending from the substantially horizontally aligned position (any direction may be suitable) to a substantially vertically aligned position (any direction may be suitable); and (B) remain substantially horizontally extended (any direction may be suitable) into the body of water 905. The second pipe section 901y is configured to resist bending in response to the application of the buoyancy force from the variable-buoyancy assembly 102. The first pipe section 901x and the second pipe section 901y may or may not be constructed using different materials in different sections throughout the fluid-line assembly 901. Required loads to be sustained may be used to identify specific types of materials to be used.

FIGS. 3a to 3e depict side views of embodiments of a second installation option for installing the apparatus 100 of any one of FIGS. 1a, 1b, 1c and 1d.

For the embodiments of FIGS. 3a to 3e, the floatation assembly 108 (depicted in FIGS. 2a and 2b) is not used or deployed.

Figure 3A:
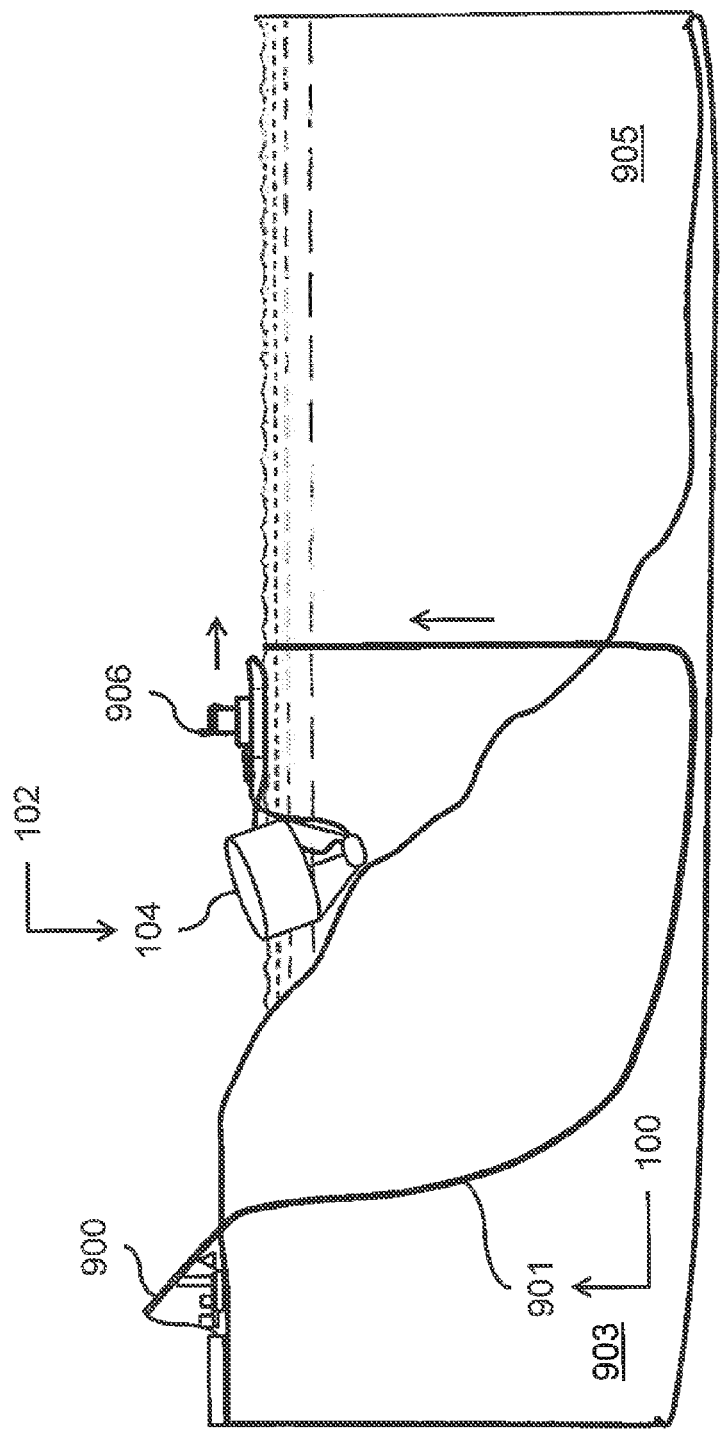
FIGS. 3a to 3e (SHEETS 11 to 15 of 24 SHEETS) depict side views of embodiments of a second installation option for installing the apparatus 100 of any one of FIGS. 1a, 1b, 1c and 1d.

Referring to the embodiment depicted in FIG. 3a, the under-water terminal of the fluid-line assembly 901 is moved to the surface of the water (by using the fluid-line installation system 900 positioned on the shore). The fluid-line installation system 900 is configured to push or move the fluid-line assembly 901 in such a way that the under-water terminal of the fluid-line assembly 901 passes through the body of water 905 and reaches the surface of the body of water 905. The connection cable 907 is attached to the under-water terminal of the fluid-line assembly 901 (positioned in the body of water 905). Once positioned at the top surface of the body of water 905, the connection cable 907 is ready and available for connection to the variable-buoyancy assembly 102. The tugboat 906 moves to the under-water terminal of the fluid-line assembly 901 that extends to the surface of the body of water 905. The tugboat 906 hauls the variable-buoyancy assembly 102 to the under-water terminal of the fluid-line assembly 901. The variable-buoyancy assembly 102 is to be operatively connected to the connection cable 907 that extends from the under-water terminal of the fluid-line assembly 901. It will be appreciated that the fluid-line assembly 901 may include multiple pipes and/or conduits (such as, referring to the embodiments of FIG. 4a and FIG. 4b).

Figure 3B:
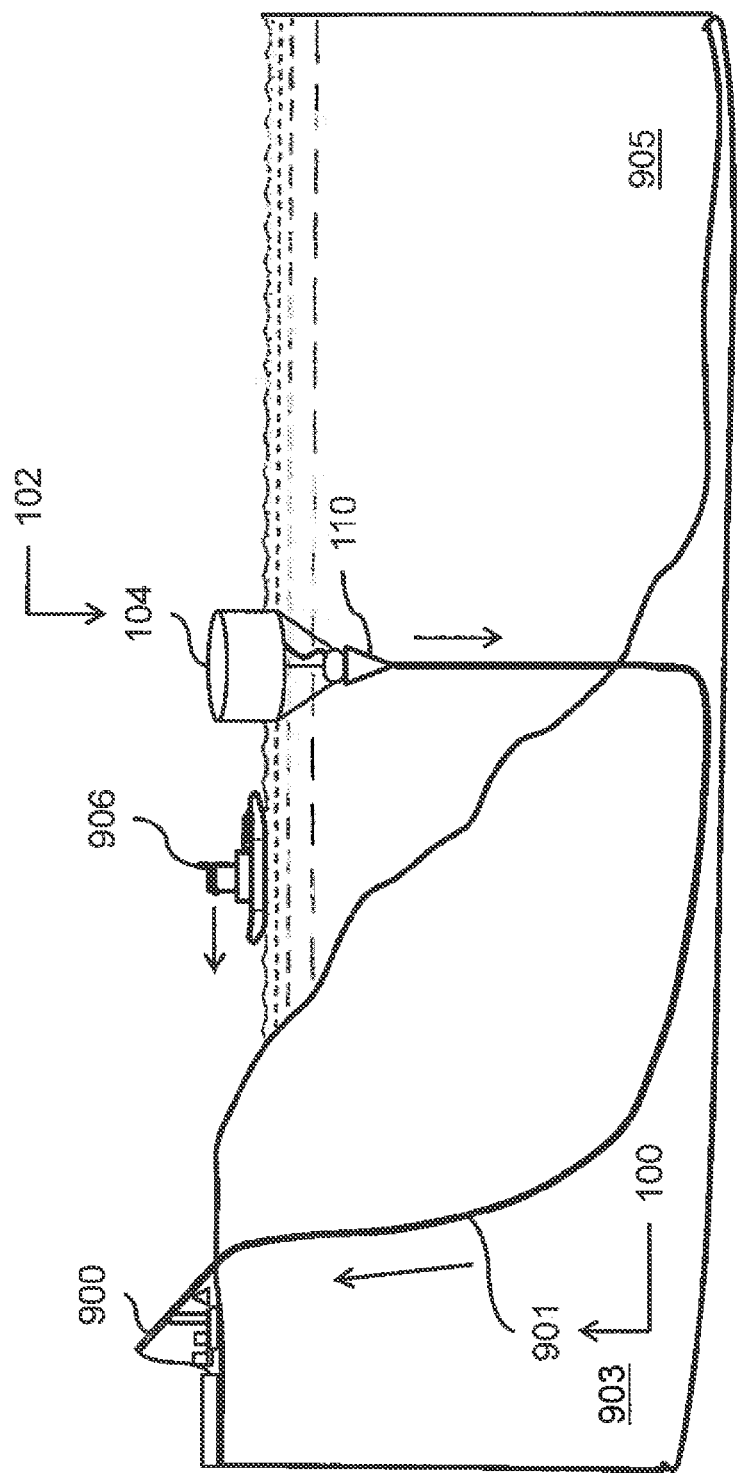

Referring to the embodiment depicted in FIG. 3b, the connection cable 907 is securely connected to the variable-buoyancy assembly 102. The tugboat 906 moves toward the shore line. The fluid-line assembly 901 is pulled (retracted) by the fluid-line installation system 900 back into the body of water 905. In this manner, the variable-buoyancy assembly 102 is pulled into the body of water 905 toward the floor (the bottom surface located under the body of water).

Figure 3C:
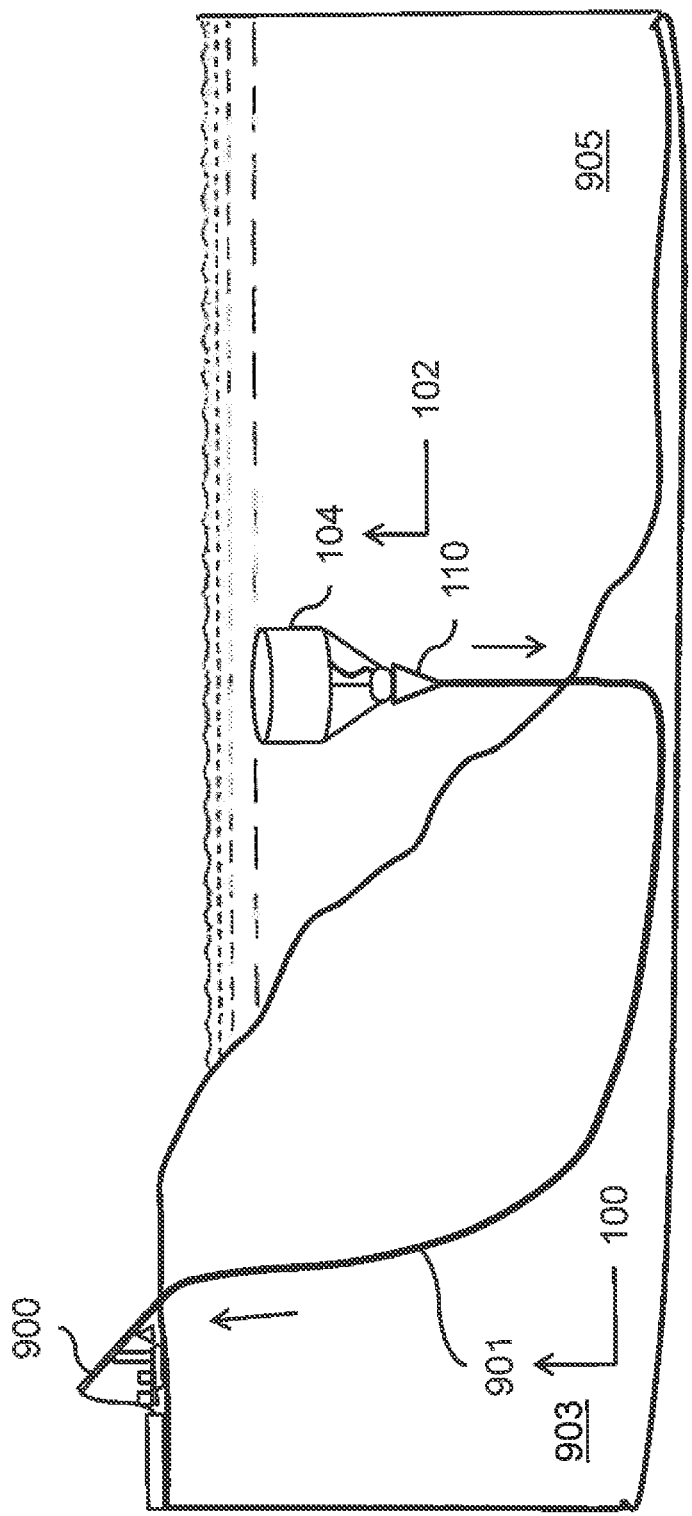

Referring to the embodiment depicted in FIG. 3c, the fluid-line installation system 900 continues to pull (retract) the fluid-line assembly 901 toward the bottom surface (located beneath the body of water 905). In this manner, the variable-buoyancy assembly 102 is pulled into the body of water 905 toward the bottom surface.

Figure 3D:
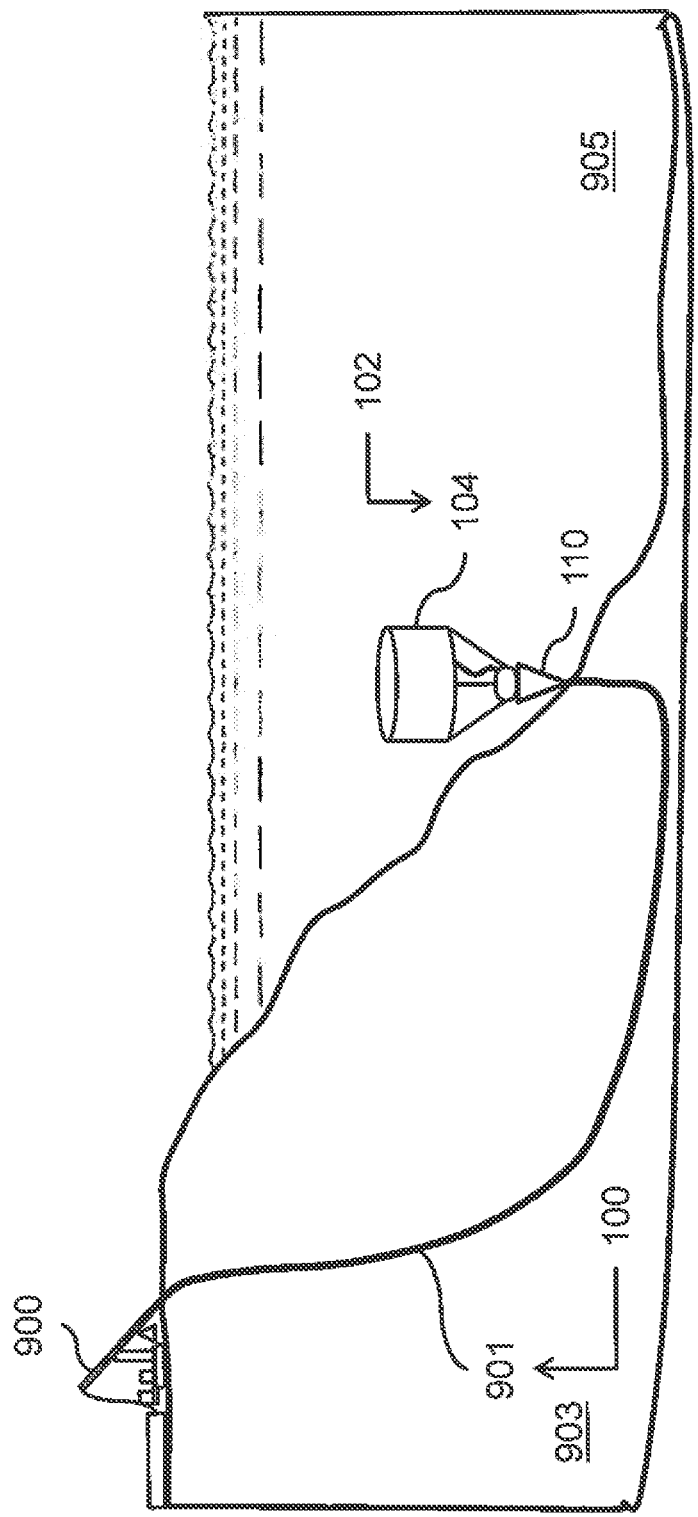

Referring to the embodiment depicted in FIG. 3d, the fluid-line installation system 900 has pulled (retracted) the fluid-line assembly 901 to a stationary position (the operative position) at the bottom surface floor of the body of water 905.

Figure 3E:
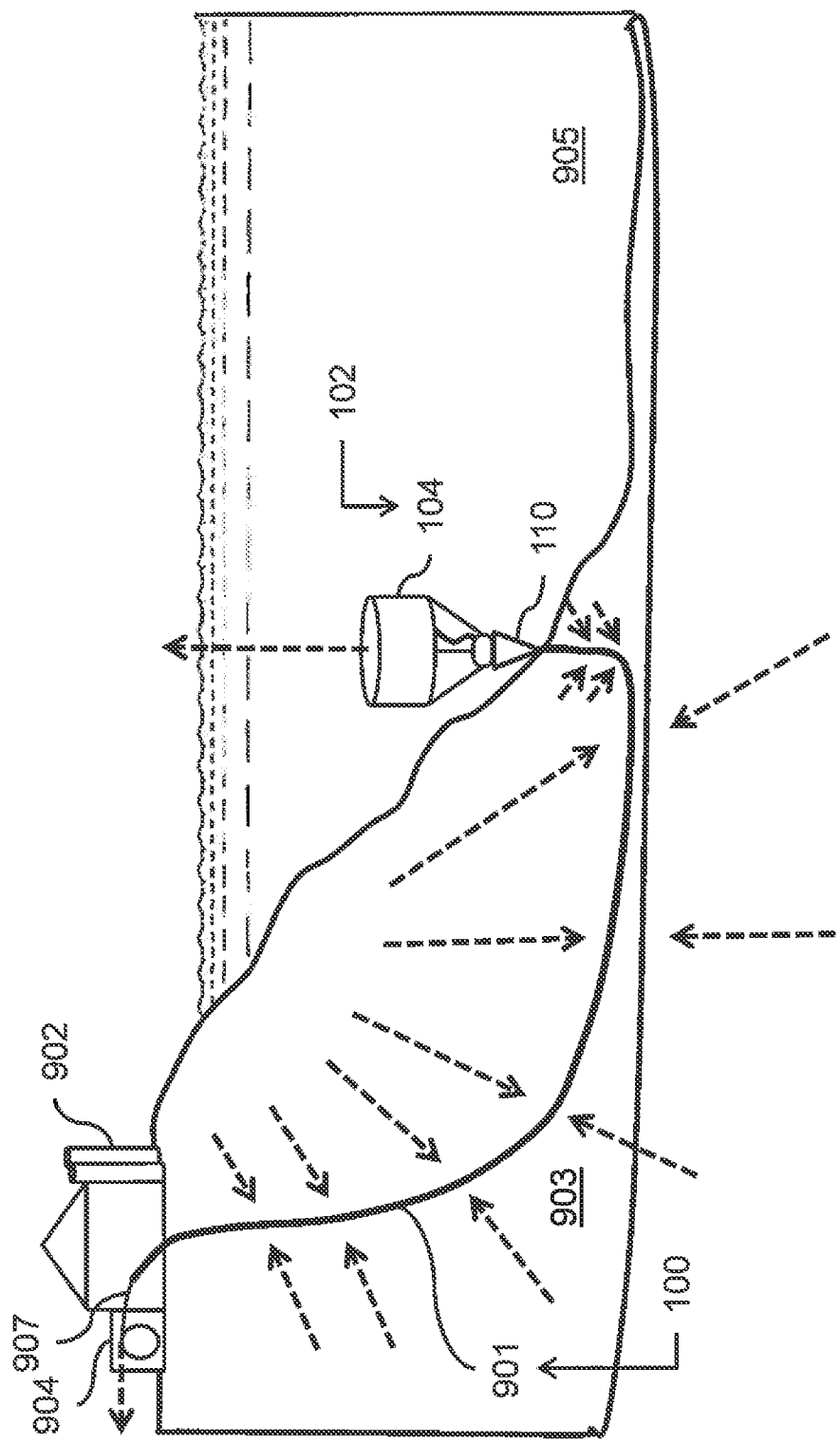

Referring to the embodiment depicted in FIG. 3e, the forces are applied to hold the variable-buoyancy assembly 102 at the bottom surface floor of the body of water 905.

FIGS. 4a to 4d depict side views of embodiments for operatively connecting the fluid-line assembly 901 to the variable-buoyancy assembly 102 for the apparatus 100 of any one of FIGS. 1a, 1b, 1c and 1d.

Referring to the embodiment depicted in FIG. 4a, the fluid-line assembly 901 includes (contains or houses) a fluid conduit 909 configured to convey the pressurized fluid. For this case, the fluid-line assembly 901 does not directly convey the pressurized fluid, but rather the fluid conduit 909 is used to convey the pressurized fluid via the fluid-line assembly 901 (the fluid-line assembly 901 is configured to indirectly convey the pressurized fluid). The fluid conduit 909 is configured to be in fluid communication with the fluid-processing plant 902 (depicted in FIGS. 2e, 2f and 3e). The fluid-line assembly 901 and the fluid conduit 909 may or may not be constructed using different materials. Required loads to be sustained may be used to identify specific types of materials to be used. The fluid-line assembly 901 is configured to slidably receive the connection cable 907 (also called a tension line). The connection cable 907 holds the force and transfers the force to the winch-and-mooring system 904. The line connector 110 securely connects the variable-buoyancy assembly 102 to the fluid-line assembly 901. The fluid-line assembly 901 includes the above-ground fluid-line section 901a and the below-ground fluid-line section 901b, which both sections may be made of the same material or different material. In accordance with an option, the connection cable 907 is configured to hold (maintain) the variable-buoyancy assembly 102 in position in the water during and after installation of the variable-buoyancy assembly 102 (as depicted in FIGS. 4a and 4b). In accordance with an option, the connection cable 907 is configured to hold the variable-buoyancy assembly 102 only during installation of the variable-buoyancy assembly 102 in the water; then once installation of the variable-buoyancy assembly 102 is completed, the connection cable 907 goes slack after installation (and another means is deployed to hold down the variable-buoyancy assembly 102 in the water relative to the line connector 110. The line connector 110 is configured to take full loads or a partial load (from the variable-buoyancy assembly 102). It will be appreciated in accordance with an option, the line connector 110 may take no load from the variable-buoyancy assembly 102 (if desired). Operations may include: (A) using the connection cable 907 to hold the variable-buoyancy assembly 102 only during installation of the variable-buoyancy assembly 102 in the water; (B) once installation of the variable-buoyancy assembly 102 is completed, permitting the connection cable 907 to go slack after installation; and (C) holding down the variable-buoyancy assembly 102 in the water relative to the line connector 110 once operatively positioned in the body of water 905. It will be appreciated that any means may allow (such as the connection to the fluid-line assembly 901 and the winch-and-mooring system 904) holding down of the variable-buoyancy assembly 102 in the water.

The variable-buoyancy assembly 102 includes a frame assembly 200 configured to: (A) handle the loads or forces to be sustained by the variable-buoyancy assembly 102, and (B) support the components of the variable-buoyancy assembly 102. The variable-buoyancy assembly 102 also includes a positive buoyant section 202 supported by the frame assembly 200. The positive buoyant section 202 includes (and is not limited to) a foam material. The positive buoyant section 202 is configured to maintain buoyance of the variable-buoyancy assembly 102. The positive buoyant section 202 provides a buoyant section that may any suitable material and/or configuration. In this manner, the variable-buoyancy assembly 102 remains upright and substantially vertically aligned (any direction may be suitable) in the body of water 905. The variable-buoyancy assembly 102 also includes a fluid cavity 204 supported by the frame assembly 200. The fluid cavity 204 is configured to hold a fluid (air, or fluid that is lighter than water). The variable-buoyancy assembly 102 also includes a fluid-transfer line 206 supported by the frame assembly 200. The fluid-transfer line 206 is configured to transfer a fluid (such as, air) to and from the fluid cavity 204 and the fluid-line assembly 901. The variable-buoyancy assembly 102 also includes the line connector 110 supported by the frame assembly 200. The line connector 110 is configured to connect (and to seal) the variable-buoyancy assembly 102 to the fluid-line assembly 901.

The fluid-line assembly 901 includes: (A) an above-ground fluid-line section 901a (to be operatively connected to the line connector 110), and (B) a below-ground fluid-line section 901b. The above-ground fluid-line section 901a extends from the below-ground fluid-line section 901b. The above-ground fluid-line section 901a egresses from the shore section 903 and into the body of water 905 (at any desired angle). As depicted, the above-ground fluid-line section 901a egresses from the shore section 903 at a substantially vertically aligned direction (any direction may be suitable).

The connection cable 907 is a structural line (a tension line) connected to the winch-and-mooring system 904 (depicted in FIGS. 2e, 2f, 3e, 5 and 7). The connection cable 907 is used to establish the initial seal between the line connector 110 and the entrance leading into the under-water terminal of the fluid-line assembly 901.

The fluid-line assembly 901 defines a fluid transfer fluid conduit 909 configured to convey pressurized fluid (if so desired) between the variable-buoyancy assembly 102 and the interior of the fluid-line assembly 901. In this manner, the fluid conduit 909 is configured to be in fluid communication with the fluid-processing plant 902 (depicted in FIGS. 2e, 2f and 3e). The fluid conduit 909 is defined by a separate conduit (hose line) if so desired.

Referring to the embodiment depicted in FIG. 4b, the fluid-line assembly 901 includes a hollow interior configured to convey the pressurized fluid. The fluid conduit 909 of the embodiment of FIG. 4a is not used in the embodiments of FIG. 4b. The fluid-line assembly 901 is configured to be in fluid communication with the fluid-processing plant 902 (depicted in FIGS. 2e, 2f and 3e). The fluid-line assembly 901 receives the connection cable 907 (also called a tension line). A fluid-transfer line 206 is provided by the line connector 110. The fluid-transfer line 206 is configured to convey the pressurized fluid from the interior of the fluid-line assembly 901 to the variable-buoyancy assembly 102. The fluid-line assembly 901 receives (is configured to receive) the force and transfers the force to the soil surrounding the fluid-line assembly 901 (similar to the action of an under-water piling structure).

In accordance with the embodiment depicted in FIG. 4b-1, the line connector 110 provides a disk shaped body. The fluid-line assembly 901 of FIG. 4b-1 is configured to: (A) house a fluid conduit 207, and (B) house the connection cable 907. The connection cable 907 may include a conduit (if so desired) to house the connection cable 907. The connection cable 907 may be solid or may be hollow. The fluid conduit 207 extends between the variable-buoyancy assembly 102 and the fluid-processing plant 902 (depicted in FIG. 3e). The fluid conduit 207 is configured to convey the fluid between the fluid-processing plant 902 and the variable-buoyancy assembly 102. The embodiment of FIG. 4b-1 may be used (deployed) with the embodiment of FIG. 4a (if so desired). There are two connections for the embodiment depicted in FIG. 4b-1: (A) a first connection configured to resist buoyancy force, and (B) a second connection configured to pass the fluid (air) from the fluid conduit 207 to the variable-buoyancy assembly 102.

Figure 4C:
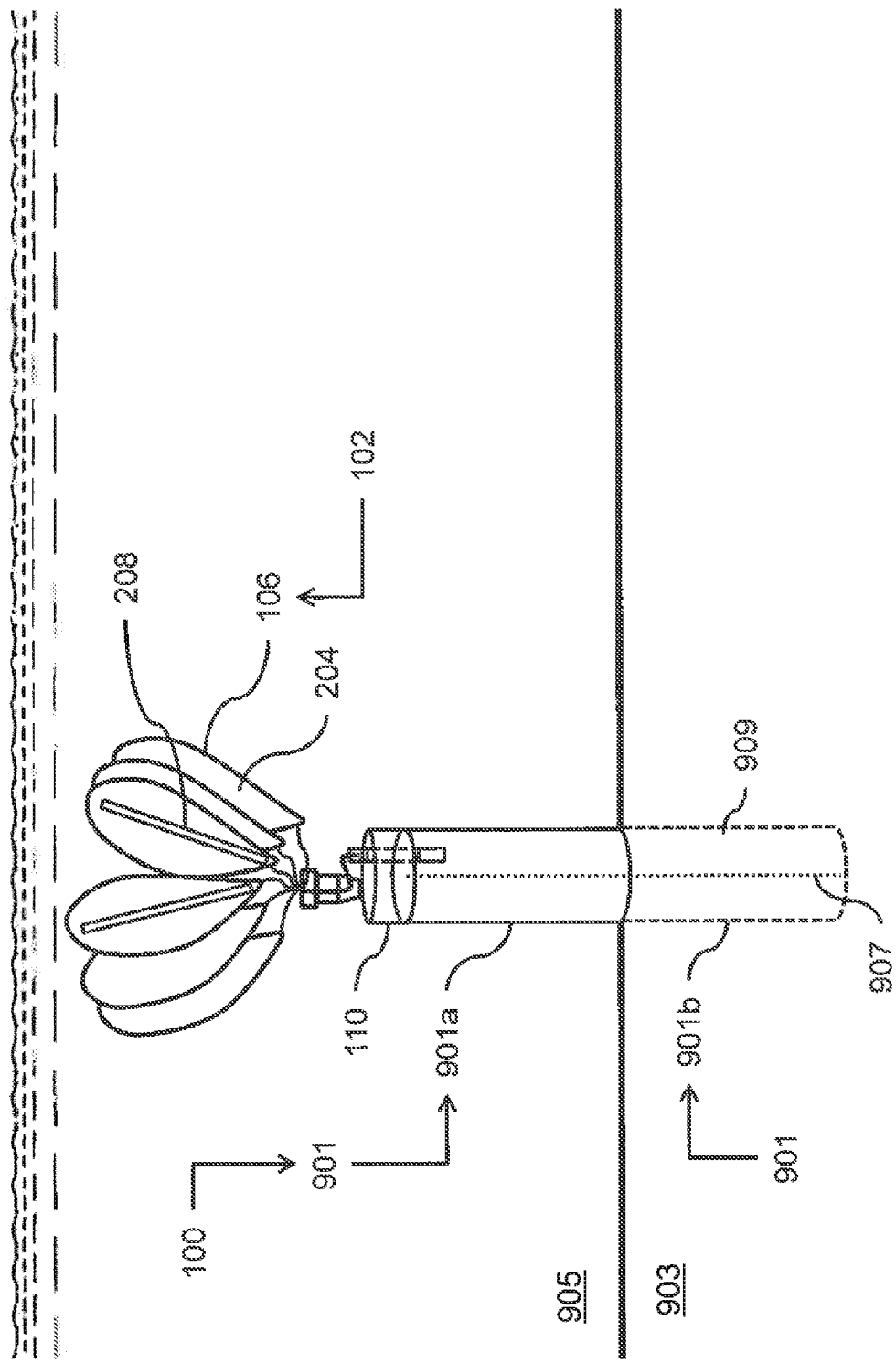

Referring to the embodiment depicted in FIG. 4c, the variable-buoyancy assembly 102 includes a flexible fabric assembly 106 (such as, a marine bag) The flexible fabric assembly 106 may include a spreader frame. The variable-buoyancy assembly 102 includes at least one or more instances of the flexible fabric assembly 106 (also called a balloon or one or more marine bags). A stand pipe 208 is positioned in each instance of the flexible fabric assembly 106 (fabric-type air bag). The stand pipe 208 may include one or more pipes connected to through the top of the flexible fabric assembly 106. The stand pipe 208 is included for operation of the flexible fabric assembly 106. It will be appreciated that a pipe may extend from the top of the flexible fabric assembly 106 (in accordance with an option). Essentially, the fluid (such as, air) enters the flexible fabric assembly 106 via the stand pipe 208 in a manner to ensure that water pressure does not choke off the ability for the fluid to exit the flexible fabric assembly 106. If the fluid enters and exits through the bottom of the flexible fabric assembly 106, the higher pressure water may squeeze the flexible fabric assembly 106 shut before all the fluid at the top of the flexible fabric assembly 106 exists. It will be appreciated that the variable-buoyancy assembly 102 may have the following configurations: (A) a fixed walled configuration that is configured to be filled with a mix of fluid and water depending on the amount of fluid stored in the variable-buoyancy assembly 102 (the water is allowed to come into contact with the fluid or air, or is separated by a membrane, etc.); (B) a flexible wall configuration (the variable-buoyancy assembly 102 collapses and the water does not contact the fluid: (C) a flexible wall configuration (the water does contact the fluid but the variable-buoyancy assembly 102 does not necessarily collapse as the variable-buoyancy assembly 102 may have an opening at the bottom); or (D) a combination of fixed and flexible wall configuration (the water may or may not contact the fluid).

Referring to FIG. 4c, a plurality of the variable-buoyancy assembly 102, in the form of marine bags, is operatively connected (directly or indirectly) to the terminal end of the fluid-line assembly 901. As depicted, the plurality of the variable-buoyancy assembly 102 are positioned at substantially the same position in the body of water 905. In this manner, each instance of the variable-buoyancy assembly 102 may be maintained at substantially the same depth and at the substantially the same pressure in the body of water 905. In accordance with FIG. 4c, there are multiple instances of the variable-buoyancy assembly 102 positioned at the same vertical level and also connected to a the fluid-line assembly 901. For the case where multiple instances of the fluid-line assembly 901 are deployed, each instance of the fluid-line assembly 901 may have their respective collection or grouping of the variable-buoyancy assembly 102, all positioned at substantially the same depth and pressure (if so desired).

Figure 4D:
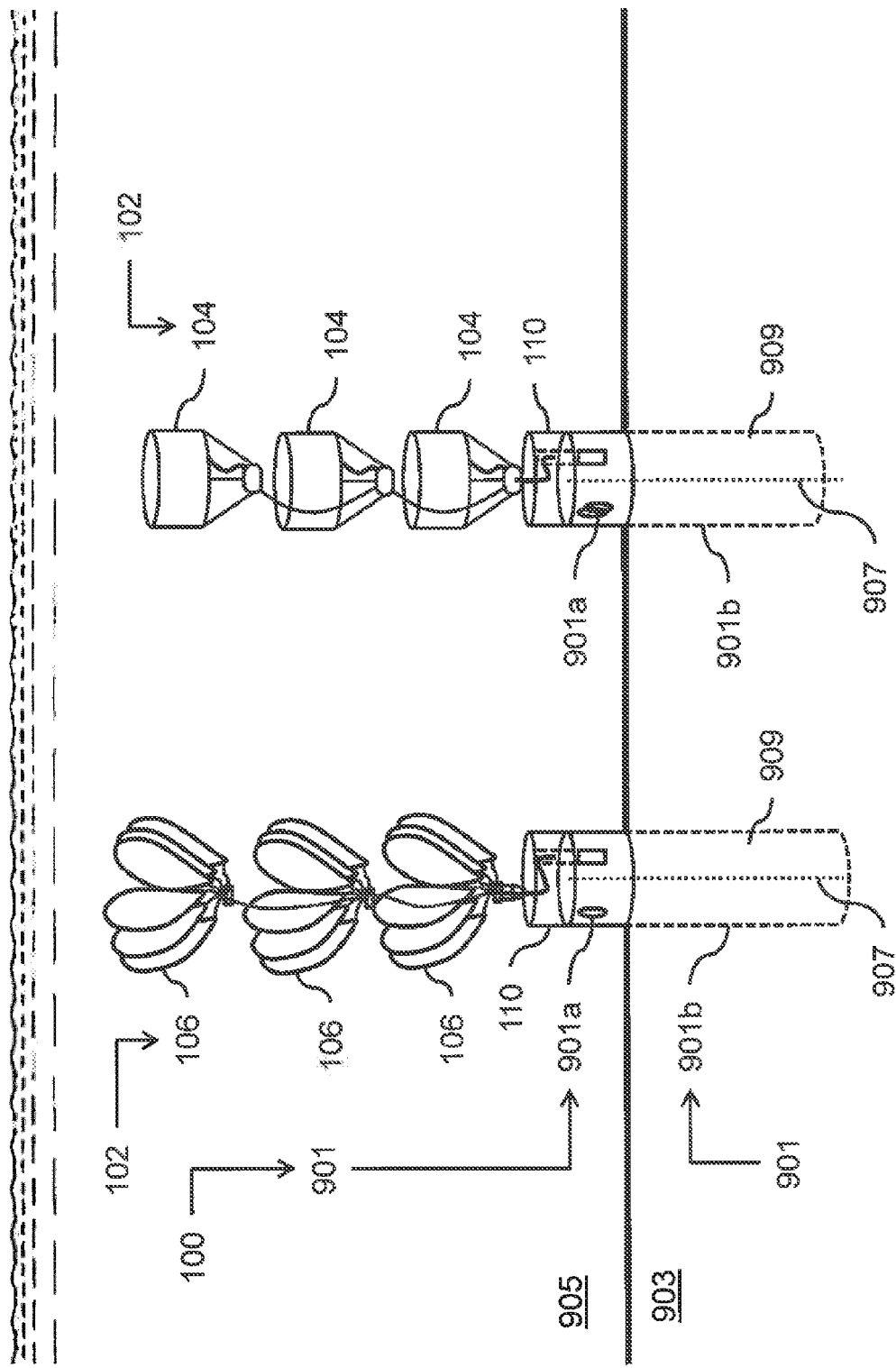

Referring to the embodiment depicted in FIG. 4d, the variable-buoyancy assembly 102 includes a stacked vertical arrangement of the variable-buoyancy assemblies 102 (positioned one above the other). The lowest positioned variable-buoyancy assembly 102 is securely connected to the line connector 110. The next lowest variable-buoyancy assembly 102 is connected to the lowest positioned variable-buoyancy assembly 102 (and so on in a serial manner).

In accordance with an embodiment, the variable-buoyancy assembly 102 includes a stacked vertical arrangement of the rigid frame assembly 104 (positioned one above the other). In accordance with another embodiment, the variable-buoyancy assembly 102 includes a stacked vertical arrangement of the flexible fabric assemblies 106 (positioned one above the other). In accordance with another embodiment, the variable-buoyancy assembly 102 includes a stacked vertical arrangement of a grouping of the flexible fabric assemblies 106 (each grouping is positioned one above the other).

Figure 5:
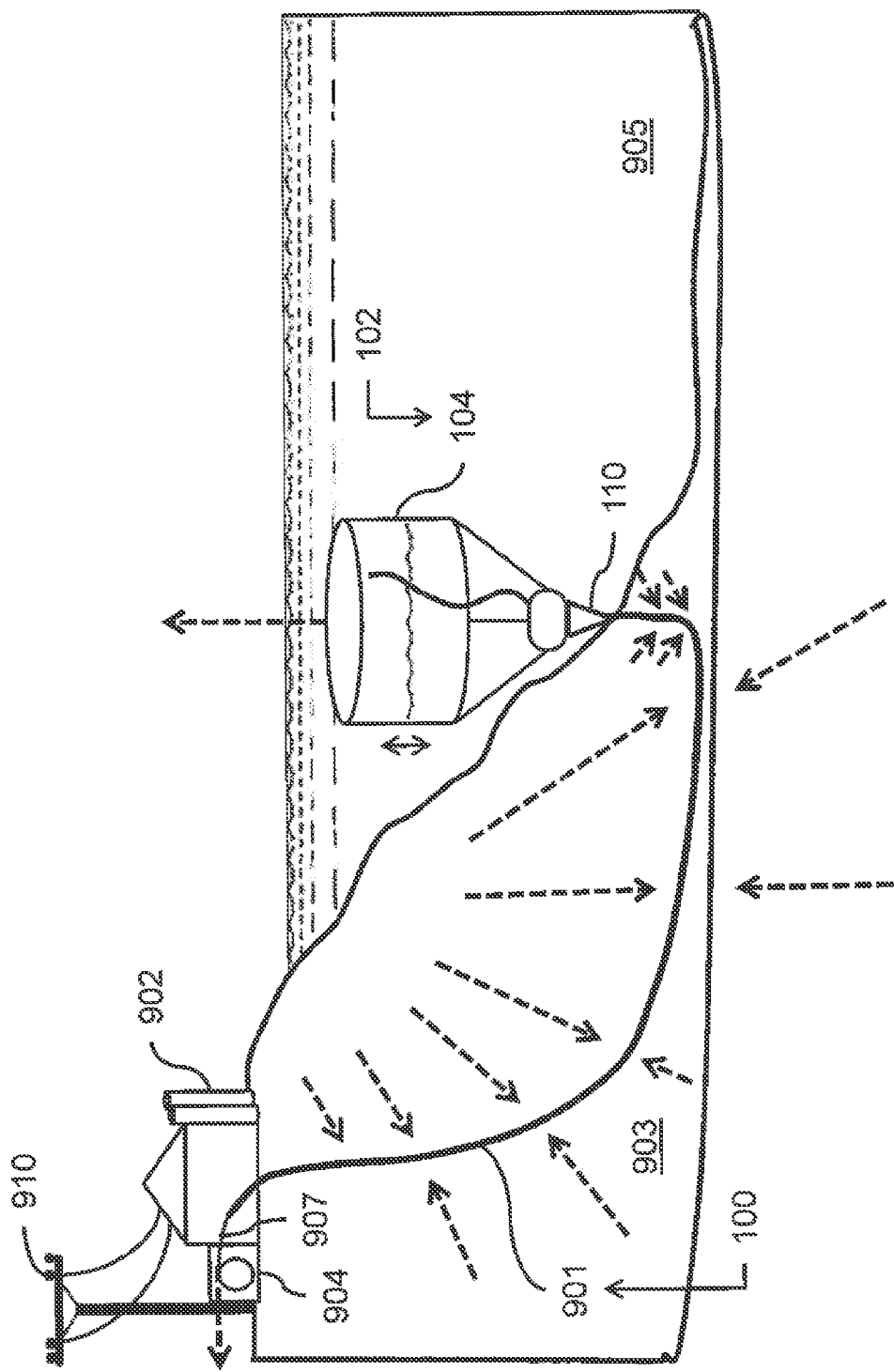
FIG. 5 (SHEET 20 of 24 SHEETS) depicts a side view of an embodiment of an operative installation of the apparatus 100 in accordance with the first installation option of FIGS. 2a to 2f and the second installation option of FIGS. 3a to 3e.

FIG. 5 depicts a side view of an embodiment of an operative installation of the apparatus 100 in accordance with the first installation option of FIGS. 2a to 2f and the second installation option of FIGS. 3a to 3e.

The variable-buoyancy assembly 102 has the line connector 110 operatively connected to the fluid-line assembly 901. The variable-buoyancy assembly 102 is positioned in the body of water 905. The line connector 110 operatively connects the variable-buoyancy assembly 102 with the fluid-line assembly 901. The electric grid 910 receives electric power (such as, from a renewable energy source, a wind generator, solar panels, etc.).

The electric grid 910 is operatively connected to the fluid-processing plant 902. For the case where the electric grid 910 provides excess electric power (because the demand is relatively low and the supply is relatively high from the renewable energy source) to the fluid-processing plant 902, the fluid-processing plant 902 receives excess electric power via the electric grid 910, and generates fluid pressure (air pressure) using the systems associated with the fluid-processing plant 902 (using a fluid compressor, etc.). The fluid pressure is transmitted to the variable-buoyancy assembly 102 via the fluid-line assembly 901. In this manner, the variable-buoyancy assembly 102 stores energy in the form of pressurized fluid.

For the case where there is a demand for electric power by the electric grid 910 (the demand is relatively high and the supply is relatively low from the renewable energy source), the fluid-processing plant 902 receives pressurized fluid from the variable-buoyancy assembly 102, converts the pressurized fluid that was received into electric energy and then provides the electric energy to the electric grid 910. The fluid-processing plant 902 receives fluid pressure (air pressure) from the variable-buoyancy assembly 102 (via the fluid-line assembly 901). The fluid pressure is received by the fluid-processing plant 902, and is used (by an electric generator) to generate electricity. The generated electricity is provided to the electric grid 910.

The winch-and-mooring system 904 is configured to provide a counteractive force to the connection cable 907. This is done in such a way that the counteractive force pulls on the variable-buoyancy assembly 102 positioned in the body of water 905. In this manner, the connection cable 907 acts as a tension line. It will be appreciated that any one of the connection cable 907 acts as a tension line and/or the counteractive force is transferred to the fluid-line assembly 901 configured to, which transfers load to the soil surrounding the fluid-line assembly 901.

FIGS. 6a to 6e depict side views of embodiments of a third installation option for installing the apparatus 100 of any one of FIGS. 1a, 1b, 1c and 1d.

In accordance with the embodiments of FIGS. 6a to 6e, the line connector 110 of FIG. 5 is not used.

Figures 6A, 6B:
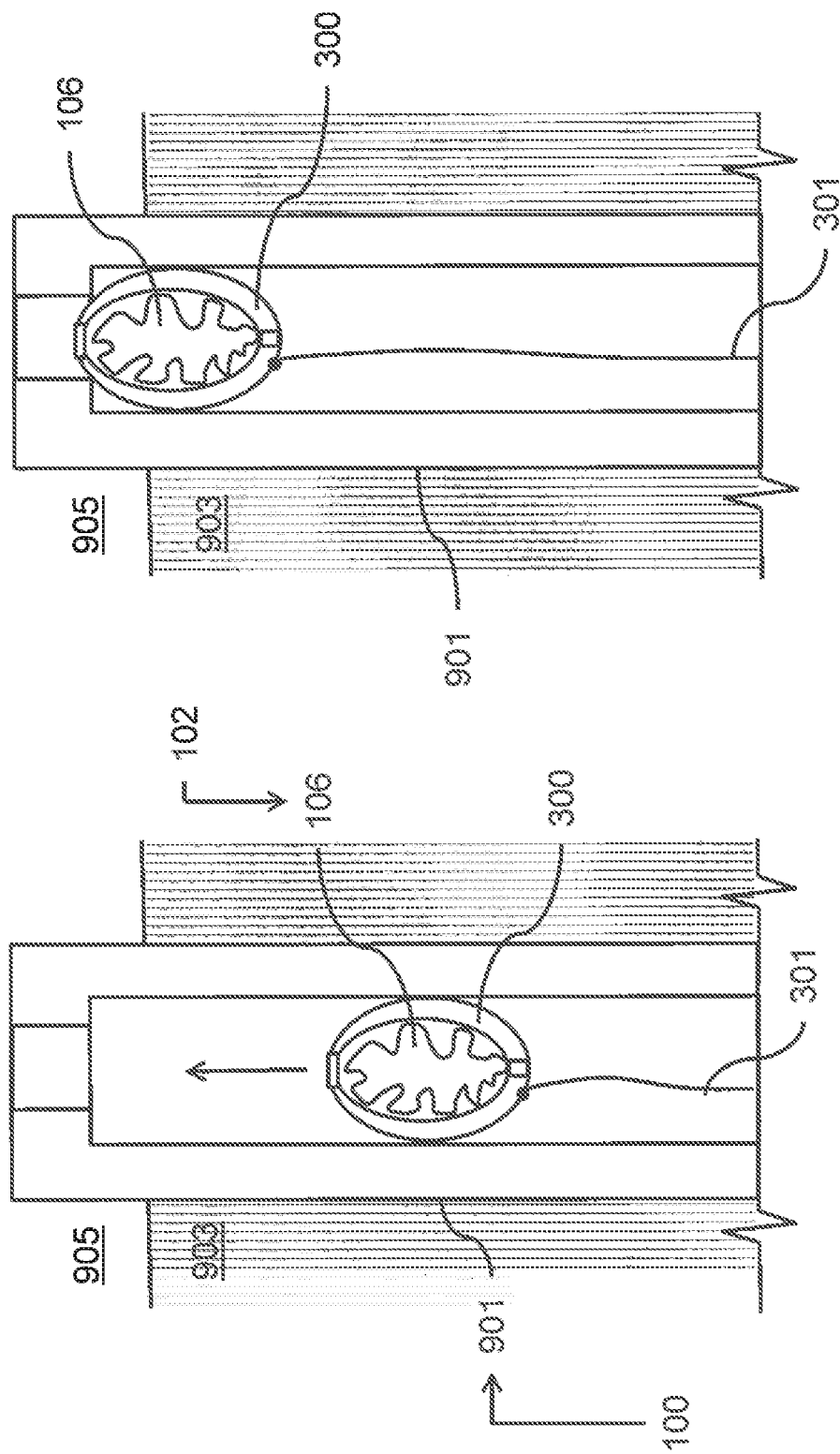

Referring to the embodiment depicted in FIG. 6a, the apparatus 100 includes a pig assembly 300 and a pig line 301. The pig line 301 is attached to the winch-and-mooring system 904. The pig assembly 300 is positioned within the fluid-line assembly 901. The pig assembly 300 is configured to be movable along the fluid-line assembly 901. The pig assembly 300 is configured to be transportable (movable) along the fluid-line assembly 901 and toward the under-water terminal of the fluid-line assembly 901. This is done in response to the application of fluid pressure to the interior of the fluid-line assembly 901 (by the fluid-processing plant 902). The pig assembly 300 is configured to define an interior chamber. The interior chamber of the pig assembly 300 is configured to operatively receive the variable-buoyancy assembly 102. The variable-buoyancy assembly 102 is configured to: (A) be folded in a collapsed state (FIGS. 6a and 6b), and (B) be unfolded in a deployed state (FIG. 6d). For instance, the variable-buoyancy assembly 102 may include a flexible fabric assembly 106. The pig assembly 300 is configured to deploy the variable-buoyancy assembly 102 via the fluid-line assembly 901 (as depicted in FIGS. 6a, 6b and 6c). The pig assembly 300 is configured to retract the variable-buoyancy assembly 102 via the fluid-line assembly 901 (as depicted in FIGS. 6d and 6e). The pig assembly 300 may be launched without the need for the stand pipe 208 (also called an expanded pipe portion (depicted in FIG. 4c). The pig assembly 300 is inserted into the fluid-line assembly 901; then a pressurized fluid (air) is introduced behind the pig assembly 300. This is done in such a way that the pressurized fluid launches (urges) the pig assembly 300 toward the under-water terminal end of the fluid-line assembly 901. In accordance with FIGS. 6a, 6b, 6c, 6d and 6e, the fluid-line assembly 901 is aligned substantially along a vertical direction (any direction may be suitable); the fluid-line assembly 901 may also exit from the underwater floor at a non-vertical angle (if so desired). The fluid-line assembly 901 is depicted as being aligned along a vertical direction that is considered an advantageous angle. It will be understood that the fluid-line assembly 901 may be aligned in any convenient orientation (vertical or horizontal or other). It is understood that the preferred orientation of the fluid-line assembly 901 is along a vertical when entering the body of water 905.

Referring to the embodiment depicted in FIG. 6b, the pig assembly 300 is urged to move toward the under-water terminal of the fluid-line assembly 901. This is done in such a way that the pig assembly 300 is positioned to abut the under-water terminal of the fluid-line assembly 901. The under-water terminal of the fluid-line assembly 901 is configured to have a tapering (narrowing) cross section. In this manner, the pig assembly 300 becomes wedged in the narrowing cross section of the under-water terminal as the pig assembly 300 is moved toward the end portion of the under-water terminal. In response to the application of additional fluid pressure (conveyed via the interior of the fluid-line assembly 901) to the interior of the pig assembly 300 (and while the pig assembly 300 remains stationary in the under-water terminal of the fluid-line assembly 901), the flexible fabric assembly 106 (positioned in the pig assembly 300) receives the additional fluid pressure from the fluid-processing plant 902. This is done in such a manner that the additional pressurized fluid inflates the flexible fabric assembly 106.

Referring to the embodiment depicted in FIG. 6c, the flexible fabric assembly 106 positioned in the pig assembly 300 is deployed. This is done in such a way that the flexible fabric assembly 106 blows up like a balloon (in response to the application of additional fluid pressure to the interior of the fluid-line assembly 901 that is communicated to the flexible fabric assembly 106 positioned in the pig assembly 300). Once deployed, the flexible fabric assembly 106 is inflated to an operative condition (for storing pressurized fluid to be provided later once the electric grid 910 of FIG. 7 demands electric power).

Referring to the embodiment depicted in FIG. 6d, for the case where the internal fluid pressure of the flexible fabric assembly 106 is reduced, the flexible fabric assembly 106 deflates. This case is used when the flexible fabric assembly 106 requires replacement or maintenance.

Referring to the embodiment depicted in FIG. 6e, once deflated, the flexible fabric assembly 106 is retracted (pulled back) through the fluid-line assembly 901 for maintenance or replacement. An advantage of this arrangement is there is no need for a tugboat 906 (as depicted in FIGS. 2a, 2b, 2c, 2d, 3a and 3b). In this manner, the cost of installing and deploying the variable-buoyancy assembly 102 is reduced.

Figure 7:
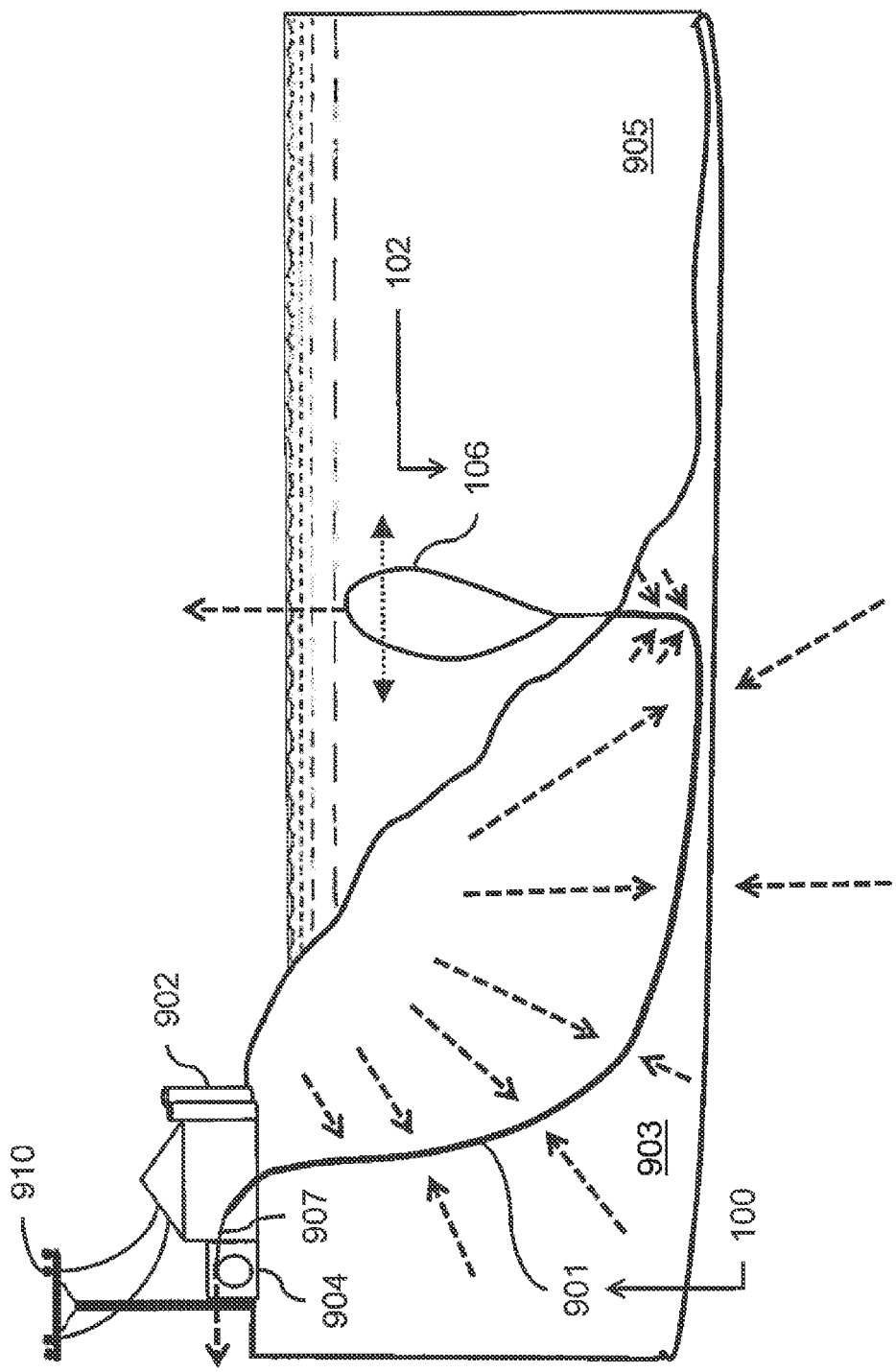
FIG. 7 (SHEET 24 of 24 SHEETS) depicts a side view of an embodiment of an operative installation of the apparatus 100 in accordance with the third installation option of FIGS. 6a to 6e.

FIG. 7 depicts a side view of an embodiment of an operative installation of the apparatus 100 in accordance with the third installation option of FIGS. 6a to 6e.

There is no line connector 110 (as depicted in FIG. 5) used in the embodiment of FIG. 7. This arrangement further reduces costs compared to the embodiments depicted in FIGS. 2e, 2f, 3e, 5 and 7.

In view of FIGS. 2f, 3e, 5 and 7, there is depicted the apparatus 100 for use with the fluid-processing plant 902 configured to generate and store the pressurized fluid. The fluid-processing plant 902 is spaced apart from a body of water 905. The apparatus 100 includes the variable-buoyancy assembly 102 positioned in the body of water 905 in such a way that a buoyancy force urges the variable-buoyancy assembly 102 to move toward the surface of the body of water 905. The apparatus 100 also includes a non-collapsible fluid-line assembly 901 positionally anchored, at least in part, underground in such a way that the non-collapsible fluid-line assembly 901 extends, at least in part, into the body of water 905. The non-collapsible fluid-line assembly 901 fluidly connects the fluid-processing plant 902 and the variable-buoyancy assembly 102 together in such a way that the non-collapsible fluid-line assembly 901 conveys the pressurized fluid between the fluid-processing plant 902 and the variable-buoyancy assembly 102. The non-collapsible fluid-line assembly 901 transmits an anchoring force from the ground to the variable-buoyancy assembly 102; this is done in such a way that the anchoring force substantially counteracts, the buoyancy force acting on the non-collapsible fluid-line assembly 901. The anchoring force substantially urges the variable-buoyancy assembly 102 to remain below the surface of the body of water 905. The arrangement of the apparatus reduces, at least in part, installation costs and/or construction costs and/or maintenance costs associated with the apparatus 100.

In association with FIGS. 2f, 3e, 5 and 7, there is provided a method of operating the fluid-processing plant 902 configured to generate and store the pressurized fluid (the fluid-processing plant 902 is spaced apart from a body of water 905). The method includes: (A) positioning a variable-buoyancy assembly 102 in the body of water 905 in such a way that a buoyancy force urges the variable-buoyancy assembly 102 to move toward the surface of the body of water 905; (B) positionally anchoring, at least in part, a non-collapsible fluid-line assembly 901 underground in such a way that the non-collapsible fluid-line assembly 901 extends, at least in part, into the body of water 905; (C) fluidly connecting, via the non-collapsible fluid-line assembly 901, the fluid-processing plant 902 and the variable-buoyancy assembly 102 together in such a way that the non-collapsible fluid-line assembly 901 conveys the pressurized fluid between the fluid-processing plant 902 and the variable-buoyancy assembly 102; and (D) transmitting an anchoring force, via the non-collapsible fluid-line assembly 901, from the ground to the variable-buoyancy assembly 102 in such a way that the anchoring force substantially counteracts the buoyancy force acting on the non-collapsible fluid-line assembly 901, and the anchoring force substantially urges the variable-buoyancy assembly 102 to remain below the surface of the body of water 905.

In association with FIGS. 2f, 3e, 5 and 7, there is provided a method for deployment of the fluid-processing plant 902. The method includes: (A) positioning a variable-buoyancy assembly 102 in the body of water 905 in such a way that a buoyancy force urges the variable-buoyancy assembly 102 to move toward the surface of the body of water 905; (B) positionally anchoring, at least in part, a non-collapsible fluid-line assembly 901 underground in such a way that the non-collapsible fluid-line assembly 901 extends, at least in part, into the body of water 905, and the non-collapsible fluid-line assembly 901 being configured to fluidly connect the fluid-processing plant 902 and the variable-buoyancy assembly 102 together in such a way that the non-collapsible fluid-line assembly 901 conveys the pressurized fluid between the fluid-processing plant 902 and the variable-buoyancy assembly 102; and (C) transmitting an anchoring force, via the non-collapsible fluid-line assembly 901, from the ground to the variable-buoyancy assembly 102 in such a way that the anchoring force substantially counteracts the buoyancy force acting on the non-collapsible fluid-line assembly 901, and the anchoring force substantially urges the variable-buoyancy assembly 102 to remain below the surface of the body of water 905.

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if the examples (embodiments) include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s).

It is understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A method of operating a fluid-processing plant being configured to generate and store a pressurized fluid, and being spaced apart from a body of water, the method comprising:
   positioning a variable-buoyancy assembly in the body of water in such a way that a buoyancy force urges the variable-buoyancy assembly to move toward a top surface of the body of water;
   positionally anchoring, at least in part, a non-collapsible fluid-line assembly underground in such a way that the non-collapsible fluid-line assembly extends, at least in part, into the body of water;
   fluidly connecting, via the non-collapsible fluid-line assembly, the fluid-processing plant and the variable-buoyancy assembly together in such a way that the non-collapsible fluid-line assembly conveys the pressurized fluid between the fluid-processing plant and the variable-buoyancy assembly; and
   transmitting an anchoring force, via the non-collapsible fluid-line assembly, from the ground to the variable-buoyancy assembly in such a way that the anchoring force substantially counteracts the buoyancy force acting on the variable buoyancy assembly, and the anchoring force substantially urges the variable-buoyancy assembly to remain below the top surface of the body of water;
   securely connecting a line connector of the variable-buoyancy assembly to a connection cable extending from an under-water terminal of the non-collapsible fluid-line assembly;
   pulling the connection cable in such a way as to move the line connector of the variable-buoyancy assembly to the under-water terminal of the non-collapsible fluid-line assembly; and
   receiving the line connector at the under-water terminal of the non-collapsible fluid-line assembly in the body of water in such a way that the line connector permits a passage of pressurized fluid between the variable-buoyancy assembly and the non-collapsible fluid-line assembly while the line connector remains operatively connected to the under-water terminal of the non-collapsible fluid-line assembly.

2. The method of claim 1, further comprising:
   installing the fluid-processing plant on a shore section relative to an electric grid.

3. The method of claim 2, further comprising: using the fluid-processing plant to: (A) consume electricity being provided by the electric grid to generate the pressurized fluid; and (B) use an accumulated pressurized fluid to render demand electricity to be provided to the electric grid.

4. The method of claim 3, further comprising: using the variable-buoyancy assembly to:

accumulate the pressurized fluid being generated by the fluid-processing plant while the fluid-processing plant consumes the electricity being provided by the electric grid; and provide the accumulated pressurized fluid to the fluid-processing plant in such a way that the fluid-processing plant renders the accumulated pressurized fluid to generate the demand electricity to be provided to the electric grid.

5. The method of claim 4, further comprising: using the non-collapsible fluid-line assembly to:

facilitate pressurized fluid exchange between the fluid-processing plant and the variable-buoyancy assembly; and ballast the variable-buoyancy assembly being positioned in the body of water in such a way that the variable-buoyancy assembly remains in the body of water while the non-collapsible fluid-line assembly facilitates pressurized fluid exchange.

6. The method of claim 5, further comprising installing the non-collapsible fluid-line assembly by using a fluid-line installation system being positionable relative to the body of water.

7. The method of claim 1, further comprising installing the non-collapsible fluid-line assembly by directional drilling.

8. The method of claim 1, further comprising extending the non-collapsible fluid-line assembly from the top surface of a shore section;

extending the non-collapsible fluid-line assembly underground and bypassing the water positioned adjacent to a shore line facing the top surface of the body of water in such a way that the non-collapsible fluid-line assembly enters into the body of water at a position located between the top surface of the body of water and a bottom floor surface located beneath the body of water; and maintaining the non-collapsible fluid-line assembly, once operatively installed, in a secured stationary position by using the weight of earth resting on the non-collapsible fluid-line assembly.

9. The method of claim 1, further comprising: extending the connection cable along the non-collapsible fluid-line assembly; connecting the connection cable to a floatation assembly, the floatation assembly being configured to float once placed in the body of water;

inserting the floatation assembly in an interior of the non-collapsible fluid-line assembly at a winch-and-mooring system, fluidly pressurizing the non-collapsible fluid-line assembly by using the fluid-processing plant in such a way that the floatation assembly is urged to move from the fluid-processing plant toward the body of water along the interior of the non-collapsible fluid-line assembly;

increasing a fluid pressure in the interior of the non-collapsible fluid-line assembly to where the internal fluid pressure urges the floatation assembly to move along the non-collapsible fluid-line assembly from an above-ground terminal of the non-collapsible fluid-line assembly located on shore to the under-water terminal located in the body of water;

passing the floatation assembly through the non-collapsible fluid-line assembly from the fluid-processing plant toward the body of water in response to increasing the fluid pressure in the non-collapsible fluid-line assembly;

using the pressurized fluid to push the floatation assembly through the non-collapsible fluid-line assembly in such a way that the floatation assembly exits the under-water terminal of the non-collapsible fluid-line assembly located in the body of water; and permitting the floatation assembly to exit from the non-collapsible fluid-line assembly in such a way that the floatation assembly floats to the top surface of the body of water, and brings the connection cable along to the water surface.

10. The method of claim 9, further comprising placing a tracking transmitter on the floatation assembly; and using the tracking transmitter to broadcast a radio signal detectable by a directional antenna in such a way that movement of the floatation assembly is capable of being tracked, at least in part, while traveling via the body of water.

11. The method of claim 1, further comprising: permitting a floatation assembly to rise and float to the top surface of the body of water once the floatation assembly exits the under-water terminal of the non-collapsible fluid-line assembly;

hauling the variable-buoyancy assembly to a place where the floatation assembly has risen to the top surface of the body of water;

disconnecting and removing the floatation assembly from the connection cable;

hauling the line connector to the under-water terminal of the non-collapsible fluid-line assembly; and maintaining the variable-buoyancy assembly underwater below the top surface of the water.

12. The method of claim 1, wherein the step of pulling the connection cable comprises: retracting the connection cable by a winch-and-mooring system in such a way that the variable-buoyancy assembly is hauled toward the under-water terminal of the non-collapsible fluid-line assembly; and wherein the step of receiving the line connector comprises:

setting up a seal between the under-water terminal of the non-collapsible fluid-line assembly and the line connector of the variable buoyancy assembly once the line connector is forcibly urged into contact with the opening of the under-water terminal of the non-collapsible fluid-line assembly; and pressurizing a section of the non-collapsible fluid-line assembly between the line connector at the under-water terminal and an above-ground terminal of the non-collapsible fluid-line assembly once the under-water terminal of the non-collapsible fluid-line assembly is sealed.

13. The method of claim 12, further comprising:

locking the line connector to the under-water terminal of the non-collapsible fluid-line assembly;

wherein the line connector transfers the buoyancy force to the non-collapsible fluid-line assembly; and relaxing tension in the connection cable once the lock and seal are activated via the line connector.

14. The method of claim 1, further comprising: using a fluid-line installation system to push the non-collapsible fluid-line assembly in such a way that the under-water terminal of the non-collapsible fluid-line assembly passes through the body of water and reaches the top surface of the body of water, and once at the top surface of the body of water, the connection cable is ready and available for connection to the variable-buoyancy assembly since the under-water terminal of the non-collapsible fluid-line assembly extends to the top surface of the body of water;

hauling the variable-buoyancy assembly to the under-water terminal of the non-collapsible fluid-line assembly; and connecting the variable-buoyancy assembly to the connection cable that extends from the under-water terminal of the non-collapsible fluid-line assembly.

15. The method of claim 14, further comprising: using the fluid-line installation system to retract the non-collapsible fluid-line assembly back into the body of water in such a way that the variable-buoyancy assembly is pulled into the body of water toward a floor of the body of water; and using the fluid-line installation system to retract the non-collapsible fluid-line assembly to a position under the top surface of the water and in the body of water.

16. The method of claim 1, further comprising: using the connection cable to hold the variable-buoyancy assembly only during installation of the variable-buoyancy assembly in the water;

once installation of the variable-buoyancy assembly is completed, permitting the connection cable to go slack after installation; and holding down the variable-buoyancy assembly in the water relative to the line connector once operatively positioned in the body of water.

17. The method of claim 1, further comprising: conveying the pressurized fluid from the interior of the non-collapsible fluid-line assembly to the variable-buoyancy assembly; and providing a counteractive force to the pressurized fluid with the connection cable, in such a way that the counteractive force pulls on the variable-buoyancy assembly positioned in the body of water, and in this manner, the connection cable acts as a tension line.

18. The method of claim 1, further comprising: using the connection cable to maintain the variable-buoyancy assembly in position in the water during and after installation of the variable-buoyancy assembly.

19. The method of claim 1, further comprising: raising the variable-buoyancy assembly to the surface of the body of water for any one of maintenance and inspection of the variable-buoyancy assembly; lowering the variable-buoyancy assembly, once any one of maintenance and inspection of the variable-buoyancy assembly is completed into the body of water; and locking the variable-buoyancy assembly into place in the body of water.

* * * * *